US008814656B2

(12) United States Patent
Caputo

(10) Patent No.: US 8,814,656 B2
(45) Date of Patent: Aug. 26, 2014

(54) GAMING SYSTEM, GAMING DEVICE, AND METHOD PROVIDING ONE OR MORE WILD REEL WAGER OPTIONS

(75) Inventor: Scott A. Caputo, Santa Clara, CA (US)

(73) Assignee: IGT, Las Vegas, NV (US)

( * ) Notice: Subject to any disclaimer, the term of this patent is extended or adjusted under 35 U.S.C. 154(b) by 318 days.

(21) Appl. No.: 13/323,337

(22) Filed: Dec. 12, 2011

(65) Prior Publication Data

US 2013/0150142 A1 Jun. 13, 2013

(51) Int. Cl.
*A63F 9/24* (2006.01)
*A63F 13/00* (2014.01)

(52) U.S. Cl.
USPC .................. 463/20; 463/16; 463/21; 463/25; 463/42

(58) Field of Classification Search
USPC ................. 463/16, 20, 21, 25, 42; 273/138.1, 273/138.2, 143 R
See application file for complete search history.

(56) References Cited

U.S. PATENT DOCUMENTS 4,363,485 A 12/1982 Edwall
4,448,419 A 5/1984 Telnaes
4,582,324 A 4/1986 Koza et al.
4,624,459 A 11/1986 Kaufman
4,669,731 A 6/1987 Clarke
4,695,053 A 9/1987 Vazquez, Jr. et al.
4,743,022 A 5/1988 Wood
4,743,024 A 5/1988 Helm et al.
4,756,532 A 7/1988 Kamille
4,781,377 A 11/1988 McVean et al.
4,838,552 A 6/1989 Hagiwara
4,856,787 A 8/1989 Itkis
4,948,134 A 8/1990 Suttle et al.
4,964,642 A 10/1990 Kamille
4,991,848 A 2/1991 Greenwood et al.

(Continued)

FOREIGN PATENT DOCUMENTS

AU 1999/017318 2/1999
EP 0 945 837 9/1999

(Continued)

OTHER PUBLICATIONS

Hot New Games, Indian Gaming, Jan. 2008, pp. 60-62 (3 pages).

(Continued)

*Primary Examiner* — William Brewster
*Assistant Examiner* — Ryan Hsu
(74) *Attorney, Agent, or Firm* — Neal, Gerber & Eisenberg LLP

(57) ABSTRACT

The present disclosure provides a gaming system, device, and method providing wild reel wager options for a spinning reel type wagering game. The wagering game includes: a plurality of reels; a plurality of symbols; and one or more wild reel wager options, each of which is associated with one of a plurality of wild reel wager amounts. If a player wagers one of the wild reel wager amounts on a play of the wagering game, the gaming system determines, based on the wild reel wager option associated with that wild reel wager amount, a set of one or more of the reels to be wild reels, and causes each of the determined set of the reels to be wild reels for that play. The gaming system causes each of the reels to spin and display one or more of the symbols, and provides any awards based on the displayed symbols.

28 Claims, 18 Drawing Sheets

(56) References Cited

U.S. PATENT DOCUMENTS

| | | | |
|---|---|---|---|
| 5,019,973 | A | 5/1991 | Wilcox et al. |
| 5,022,653 | A | 6/1991 | Suttle et al. |
| 5,085,436 | A | 2/1992 | Bennett |
| 5,092,598 | A | 3/1992 | Kamille |
| 5,100,137 | A | 3/1992 | Fulton |
| 5,116,055 | A | 5/1992 | Tracy |
| 5,123,649 | A | 6/1992 | Tiberio |
| 5,159,549 | A | 10/1992 | Hallman, Jr. et al. |
| 5,178,390 | A | 1/1993 | Okada |
| 5,178,395 | A | 1/1993 | Lovell |
| 5,280,909 | A | 1/1994 | Tracy |
| 5,286,023 | A | 2/1994 | Wood |
| 5,332,228 | A | 7/1994 | Schultz |
| 5,342,049 | A | 8/1994 | Wichinsky et al. |
| 5,344,144 | A | 9/1994 | Canon |
| 5,397,125 | A | 3/1995 | Adams |
| 5,423,539 | A | 6/1995 | Nagao |
| 5,431,408 | A | 7/1995 | Adams |
| 5,486,005 | A | 1/1996 | Neal |
| 5,511,781 | A | 4/1996 | Wood et al. |
| 5,524,888 | A | 6/1996 | Heidel |
| 5,542,669 | A | 8/1996 | Charron et al. |
| 5,643,088 | A | 7/1997 | Vaughn et al. |
| 5,645,486 | A | 7/1997 | Nagao et al. |
| 5,655,961 | A | 8/1997 | Acres et al. |
| 5,657,993 | A | 8/1997 | Merlino et al. |
| 5,664,998 | A | 9/1997 | Seelig et al. |
| 5,711,525 | A | 1/1998 | Breeding |
| 5,722,891 | A | 3/1998 | Inoue |
| 5,788,573 | A | 8/1998 | Baerlocher |
| 5,806,045 | A | 9/1998 | Biorge et al. |
| 5,806,855 | A | 9/1998 | Cherry |
| 5,807,172 | A | 9/1998 | Piechowiak |
| 5,820,460 | A | 10/1998 | Fulton |
| 5,823,873 | A | 10/1998 | Moody |
| 5,823,874 | A | 10/1998 | Adams |
| 5,833,537 | A | 11/1998 | Barrie |
| 5,833,538 | A | 11/1998 | Weiss |
| 5,848,932 | A | 12/1998 | Adams |
| 5,851,148 | A | 12/1998 | Brune et al. |
| 5,902,184 | A | 5/1999 | Bennett et al. |
| 5,910,048 | A | 6/1999 | Feinberg |
| 5,911,418 | A | 6/1999 | Adams |
| 5,947,820 | A | 9/1999 | Morro et al. |
| 5,947,821 | A | 9/1999 | Stone |
| 5,967,893 | A | 10/1999 | Lawrence et al. |
| 5,967,894 | A | 10/1999 | Kinoshita et al. |
| 5,980,384 | A | 11/1999 | Barrie |
| 5,993,316 | A | 11/1999 | Coyle et al. |
| 5,997,401 | A | 12/1999 | Crawford |
| 6,004,207 | A | 12/1999 | Wilson, Jr. et al. |
| 6,032,955 | A | 3/2000 | Luciano et al. |
| 6,033,307 | A | 3/2000 | Vancura |
| 6,059,289 | A | 5/2000 | Vancura |
| 6,059,658 | A | 5/2000 | Mangano et al. |
| 6,062,980 | A | 5/2000 | Luciano |
| 6,062,981 | A | 5/2000 | Luciano, Jr. |
| 6,068,552 | A | 5/2000 | Walker et al. |
| 6,077,163 | A | 6/2000 | Walker et al. |
| 6,089,977 | A | 7/2000 | Bennett |
| 6,089,978 | A | 7/2000 | Adams |
| 6,102,394 | A | 8/2000 | Wurz |
| 6,102,400 | A | 8/2000 | Scott et al. |
| 6,106,393 | A | 8/2000 | Sunaga et al. |
| 6,110,041 | A | 8/2000 | Walker et al. |
| 6,110,043 | A | 8/2000 | Olsen |
| 6,117,010 | A | 9/2000 | Canterbury et al. |
| 6,120,031 | A | 9/2000 | Adams |
| 6,120,378 | A | 9/2000 | Moody et al. |
| 6,126,541 | A | 10/2000 | Fuchs |
| 6,126,542 | A | 10/2000 | Fier |
| 6,142,873 | A | 11/2000 | Weiss et al. |
| 6,146,273 | A | 11/2000 | Olsen |
| 6,149,156 | A | 11/2000 | Feola |
| 6,155,925 | A | 12/2000 | Giobbi et al. |
| 6,158,741 | A | 12/2000 | Koelling |
| 6,159,097 | A | 12/2000 | Gura |
| 6,168,523 | B1 | 1/2001 | Piechowiak et al. |
| 6,173,955 | B1 | 1/2001 | Perrie et al. |
| 6,174,233 | B1 | 1/2001 | Sunaga et al. |
| 6,174,235 | B1 | 1/2001 | Walker et al. |
| 6,179,711 | B1 | 1/2001 | Yoseloff |
| 6,186,894 | B1 | 2/2001 | Mayeroff |
| 6,190,254 | B1 | 2/2001 | Bennett |
| 6,190,255 | B1 | 2/2001 | Thomas et al. |
| 6,193,606 | B1 | 2/2001 | Walker et al. |
| 6,203,429 | B1 | 3/2001 | Demar et al. |
| 6,220,959 | B1 | 4/2001 | Holmes, Jr. et al. |
| 6,224,482 | B1 | 5/2001 | Bennett |
| 6,224,483 | B1 | 5/2001 | Mayeroff |
| 6,224,484 | B1 | 5/2001 | Okuda et al. |
| 6,227,969 | B1 | 5/2001 | Yoseloff |
| 6,227,971 | B1 | 5/2001 | Weiss |
| 6,231,442 | B1 | 5/2001 | Mayeroff |
| 6,231,445 | B1 | 5/2001 | Acres |
| 6,234,897 | B1 | 5/2001 | Frohm et al. |
| 6,237,913 | B1 | 5/2001 | Kamille |
| 6,238,287 | B1 | 5/2001 | Komori et al. |
| 6,244,957 | B1 | 6/2001 | Walker et al. |
| 6,251,013 | B1 | 6/2001 | Bennett |
| 6,254,481 | B1 | 7/2001 | Jaffe |
| 6,254,482 | B1 | 7/2001 | Walker et al. |
| 6,270,409 | B1 | 8/2001 | Shuster |
| 6,290,603 | B1 | 9/2001 | Luciano, Jr. |
| 6,299,165 | B1 | 10/2001 | Nagano |
| 6,299,170 | B1 | 10/2001 | Yoseloff |
| 6,302,791 | B1 | 10/2001 | Frohm et al. |
| 6,309,299 | B1 | 10/2001 | Weiss |
| 6,309,300 | B1 | 10/2001 | Glavich |
| 6,315,662 | B1 | 11/2001 | Jorasch et al. |
| 6,315,664 | B1 | 11/2001 | Baerlocher et al. |
| 6,322,078 | B1 | 11/2001 | Adams |
| 6,328,649 | B1 | 12/2001 | Randall et al. |
| 6,347,996 | B1 | 2/2002 | Gilmore et al. |
| 6,358,147 | B1 | 3/2002 | Jaffe et al. |
| 6,364,768 | B1 | 4/2002 | Acres et al. |
| 6,368,214 | B1 | 4/2002 | Luciano |
| 6,375,570 | B1 | 4/2002 | Poole |
| 6,406,369 | B1 | 6/2002 | Baerlocher et al. |
| 6,419,578 | B1 | 7/2002 | Moody et al. |
| 6,419,579 | B1 | 7/2002 | Bennett |
| 6,428,412 | B1 | 8/2002 | Anderson et al. |
| 6,439,993 | B1 | 8/2002 | O'Halloran |
| 6,439,995 | B1 | 8/2002 | Hughs-Baird et al. |
| 6,443,837 | B1 | 9/2002 | Jaffe et al. |
| 6,467,770 | B1 | 10/2002 | Matosevic |
| 6,468,156 | B1 | 10/2002 | Hughs-Baird et al. |
| 6,471,208 | B2 | 10/2002 | Yoseloff et al. |
| 6,488,580 | B1 | 12/2002 | Robb |
| 6,491,584 | B2 | 12/2002 | Graham et al. |
| 6,494,454 | B2 | 12/2002 | Adams |
| 6,506,118 | B1 | 1/2003 | Baerlocher et al. |
| 6,514,144 | B2 | 2/2003 | Riendeau et al. |
| 6,520,856 | B1 | 2/2003 | Walker et al. |
| 6,569,013 | B1 | 5/2003 | Taylor |
| 6,569,016 | B1 | 5/2003 | Baerlocher |
| 6,582,303 | B1 | 6/2003 | Weiss |
| 6,592,457 | B1 | 7/2003 | Frohm et al. |
| 6,604,740 | B1 | 8/2003 | Singer et al. |
| 6,605,001 | B1 | 8/2003 | Tarantino |
| 6,607,437 | B2 | 8/2003 | Casey et al. |
| 6,609,969 | B1 | 8/2003 | Luciano et al. |
| 6,609,970 | B1 | 8/2003 | Luciano, Jr. |
| 6,612,575 | B1 | 9/2003 | Cole et al. |
| 6,616,142 | B2 | 9/2003 | Adams |
| 6,620,045 | B2 | 9/2003 | Berman et al. |
| 6,656,040 | B1 | 12/2003 | Brosnan et al. |
| 6,669,559 | B1 | 12/2003 | Baerlocher et al. |
| 6,682,073 | B2 | 1/2004 | Bryant et al. |
| 6,692,003 | B2 | 2/2004 | Potter et al. |
| 6,702,675 | B2 | 3/2004 | Poole et al. |
| 6,712,693 | B1 | 3/2004 | Hettinger |
| 6,726,565 | B2 | 4/2004 | Hughs-Baird |
| 6,739,970 | B2 | 5/2004 | Luciano |

(56) References Cited

U.S. PATENT DOCUMENTS

| | | | |
|---|---|---|---|
| 6,746,016 | B2 | 6/2004 | Perrie et al. |
| 6,746,328 | B2 | 6/2004 | Cannon et al. |
| 6,776,714 | B2 | 8/2004 | Ungaro et al. |
| 6,780,109 | B2 | 8/2004 | Kaminkow |
| 6,786,824 | B2 | 9/2004 | Cannon |
| 6,802,778 | B1 | 10/2004 | Lemay et al. |
| 6,805,349 | B2 | 10/2004 | Baerlocher et al. |
| 6,837,793 | B2 | 1/2005 | McClintic |
| 6,866,583 | B2 | 3/2005 | Glavich et al. |
| 6,905,406 | B2 | 6/2005 | Kamonkow et al. |
| 6,921,335 | B2 | 7/2005 | Rodgers et al. |
| 6,939,229 | B2 | 9/2005 | McClintic |
| 6,991,544 | B2 | 1/2006 | Soltys et al. |
| 6,997,808 | B2 | 2/2006 | Rodgers et al. |
| 7,029,395 | B1 | 4/2006 | Baerlocher |
| 7,048,275 | B2 | 5/2006 | Adams |
| 7,052,392 | B2 | 5/2006 | Tessmer et al. |
| 7,070,502 | B1 | 7/2006 | Bussick et al. |
| 7,070,505 | B2 | 7/2006 | Vancura et al. |
| 7,074,127 | B2 | 7/2006 | Cuddy et al. |
| 7,077,746 | B2 | 7/2006 | Torango |
| 7,090,580 | B2 | 8/2006 | Rodgers et al. |
| 7,094,148 | B2 | 8/2006 | Baerlocher et al. |
| 7,094,150 | B2 | 8/2006 | Ungaro et al. |
| 7,137,888 | B2 | 11/2006 | Glavich et al. |
| 7,156,741 | B2 | 1/2007 | Hornik et al. |
| 7,169,042 | B2 | 1/2007 | Muir et al. |
| 7,192,344 | B2 | 3/2007 | Baerlocher |
| 7,198,569 | B2 | 4/2007 | Wolf et al. |
| 7,226,359 | B2 | 6/2007 | Bussick et al. |
| 7,229,354 | B2 | 6/2007 | McNutt et al. |
| 7,241,221 | B1 | 7/2007 | Luciano, Jr. et al. |
| 7,252,592 | B2 | 8/2007 | Rodgers et al. |
| 7,291,068 | B2 | 11/2007 | Bryant et al. |
| 7,297,059 | B2 | 11/2007 | Vancura et al. |
| 7,318,774 | B2 | 1/2008 | Bryant et al. |
| 7,329,179 | B2 | 2/2008 | Baerlocher |
| 7,331,862 | B2 | 2/2008 | Rodgers et al. |
| 7,331,866 | B2 | 2/2008 | Rodgers et al. |
| 7,357,714 | B2 | 4/2008 | Tessmer et al. |
| 7,393,278 | B2 | 7/2008 | Gerson et al. |
| 7,396,279 | B2 | 7/2008 | Berman et al. |
| 7,399,225 | B2 | 7/2008 | Kaminkow |
| 7,419,429 | B2 | 9/2008 | Taylor |
| 7,442,123 | B2 | 10/2008 | Brill et al. |
| 7,513,826 | B2 | 4/2009 | Cuddy |
| 7,553,231 | B2 | 6/2009 | Rodgers et al. |
| 7,559,837 | B1 | 7/2009 | Yoseloff et al. |
| 7,563,167 | B2 | 7/2009 | Walker et al. |
| 7,591,723 | B2 | 9/2009 | Cregan et al. |
| 7,611,406 | B2 | 11/2009 | Fuller |
| 7,699,696 | B2 | 4/2010 | Baerlocher et al. |
| 7,749,063 | B2 | 7/2010 | Belger et al. |
| 7,749,071 | B2 | 7/2010 | Marks et al. |
| 7,789,751 | B2 | 9/2010 | Glavich et al. |
| 7,850,521 | B2 | 12/2010 | Rodgers et al. |
| 7,857,695 | B2 | 12/2010 | Rodgers et al. |
| 7,892,081 | B2 | 2/2011 | Glavich et al. |
| 7,914,372 | B2 | 3/2011 | Tessmer et al. |
| 8,002,621 | B2 | 8/2011 | Mattice et al. |
| 8,002,625 | B2 | 8/2011 | Maya |
| 8,007,357 | B2 | 8/2011 | Cuddy et al. |
| 2001/0054794 | A1 | 12/2001 | Cole et al. |
| 2002/0049084 | A1 | 4/2002 | Hughs-Baird et al. |
| 2002/0065123 | A1 | 5/2002 | Packes, Jr. et al. |
| 2002/0137559 | A1 | 9/2002 | Baerlocher |
| 2002/0155873 | A1 | 10/2002 | Berman et al. |
| 2002/0193158 | A1 | 12/2002 | Weiss et al. |
| 2003/0022711 | A1 | 1/2003 | Locke et al. |
| 2003/0036419 | A1 | 2/2003 | Baerlocher et al. |
| 2003/0036422 | A1 | 2/2003 | Baerlocher et al. |
| 2003/0036424 | A1 | 2/2003 | Baerlocher |
| 2003/0054873 | A1 | 3/2003 | Peterson |
| 2003/0060266 | A1 | 3/2003 | Baerlocher |
| 2003/0064779 | A1 | 4/2003 | Suda |
| 2003/0069068 | A1 | 4/2003 | Kaminkow |
| 2003/0071417 | A1 | 4/2003 | Webb |
| 2003/0114218 | A1 | 6/2003 | McClintic |
| 2003/0114219 | A1 | 6/2003 | McClintic |
| 2003/0114220 | A1 | 6/2003 | McClintic |
| 2003/0119573 | A1 | 6/2003 | McClintic |
| 2003/0119576 | A1 | 6/2003 | McClintic et al. |
| 2003/0119580 | A1 | 6/2003 | McClintic et al. |
| 2003/0125102 | A1 | 7/2003 | Cannon |
| 2003/0125103 | A1 | 7/2003 | Tessmer et al. |
| 2003/0125107 | A1 | 7/2003 | Cannon |
| 2003/0153383 | A1 | 8/2003 | Baerlocher et al. |
| 2003/0207713 | A1 | 11/2003 | Taylor |
| 2003/0232640 | A1 | 12/2003 | Walker et al. |
| 2004/0023713 | A1 | 2/2004 | Wolf et al. |
| 2004/0038724 | A1 | 2/2004 | Asdale |
| 2004/0058727 | A1 | 3/2004 | Marks et al. |
| 2004/0063492 | A1 | 4/2004 | Baerlocher et al. |
| 2004/0082378 | A1 | 4/2004 | Peterson et al. |
| 2004/0111358 | A1 | 6/2004 | Lange et al. |
| 2004/0116173 | A1 | 6/2004 | Baerlocher |
| 2004/0192432 | A1 | 9/2004 | Walker et al. |
| 2004/0219969 | A1 * | 11/2004 | Casey et al. .................... 463/20 |
| 2004/0242313 | A1 | 12/2004 | Munoz |
| 2005/0009597 | A1 * | 1/2005 | Daly .............................. 463/20 |
| 2005/0026676 | A1 | 2/2005 | Olive |
| 2005/0054429 | A1 | 3/2005 | Baerlocher et al. |
| 2005/0060050 | A1 | 3/2005 | Baerlocher |
| 2005/0071023 | A1 | 3/2005 | Gilliland et al. |
| 2005/0096123 | A1 | 5/2005 | Cregan et al. |
| 2005/0130731 | A1 | 6/2005 | Englman et al. |
| 2005/0130737 | A1 | 6/2005 | Englman et al. |
| 2005/0148384 | A1 | 7/2005 | Marks et al. |
| 2005/0202863 | A1 | 9/2005 | Macaulay |
| 2005/0208992 | A1 | 9/2005 | Randall |
| 2005/0227754 | A1 | 10/2005 | Kaminkow et al. |
| 2005/0282625 | A1 | 12/2005 | Nicely |
| 2006/0025193 | A1 | 2/2006 | Gail et al. |
| 2006/0030392 | A1 | 2/2006 | Rodgers et al. |
| 2006/0040725 | A1 | 2/2006 | Walker et al. |
| 2006/0040728 | A1 | 2/2006 | Fuller |
| 2006/0040730 | A1 | 2/2006 | Walker et al. |
| 2006/0046836 | A1 | 3/2006 | Walker et al. |
| 2006/0058095 | A1 | 3/2006 | Berman et al. |
| 2006/0063580 | A1 | 3/2006 | Nguyen et al. |
| 2006/0068883 | A1 | 3/2006 | Randall et al. |
| 2006/0068903 | A1 | 3/2006 | Walker et al. |
| 2006/0079321 | A1 | 4/2006 | Walker et al. |
| 2006/0084497 | A1 | 4/2006 | Marks et al. |
| 2006/0089191 | A1 | 4/2006 | Singer et al. |
| 2006/0111175 | A1 | 5/2006 | Walker et al. |
| 2006/0116189 | A1 | 6/2006 | Tessmer et al. |
| 2006/0121969 | A1 | 6/2006 | Marks et al. |
| 2006/0128457 | A1 | 6/2006 | Cannon |
| 2006/0142077 | A1 | 6/2006 | Miles et al. |
| 2006/0154723 | A1 | 7/2006 | Saffari et al. |
| 2006/0157928 | A1 | 7/2006 | O'Halloran |
| 2006/0178205 | A1 | 8/2006 | Bleich et al. |
| 2006/0183535 | A1 | 8/2006 | Marks et al. |
| 2006/0189387 | A1 | 8/2006 | Rigsby et al. |
| 2006/0211484 | A1 | 9/2006 | Hornik et al. |
| 2006/0211489 | A1 | 9/2006 | Walker et al. |
| 2006/0223615 | A1 | 10/2006 | Englman |
| 2006/0252515 | A1 | 11/2006 | Walker et al. |
| 2006/0252516 | A1 | 11/2006 | Walker et al. |
| 2006/0279044 | A1 | 12/2006 | Pacey |
| 2006/0287090 | A1 | 12/2006 | Ocampo |
| 2007/0021182 | A1 | 1/2007 | Gauselmann |
| 2007/0026923 | A1 | 2/2007 | Muir |
| 2007/0054726 | A1 | 3/2007 | Muir et al. |
| 2007/0060255 | A1 | 3/2007 | Baerlocher et al. |
| 2007/0060321 | A1 | 3/2007 | Vasquez et al. |
| 2007/0087804 | A1 | 4/2007 | Knowles et al. |
| 2007/0135207 | A1 | 6/2007 | Tarantino |
| 2007/0167201 | A1 | 7/2007 | Schultz |
| 2007/0167208 | A1 | 7/2007 | Acres |
| 2007/0184891 | A1 | 8/2007 | Thomas |
| 2007/0191087 | A1 | 8/2007 | Thomas et al. |
| 2007/0265061 | A1 | 11/2007 | Marks et al. |

(56) References Cited

U.S. PATENT DOCUMENTS

| | | | |
|---|---|---|---|
| 2007/0270208 | A1 | 11/2007 | Caspers et al. |
| 2007/0287532 | A1 | 12/2007 | Jackson |
| 2008/0076503 | A1 | 3/2008 | Mattice et al. |
| 2008/0102934 | A1 | 5/2008 | Tan |
| 2008/0108411 | A1 | 5/2008 | Jensen et al. |
| 2008/0113759 | A1 | 5/2008 | Baerlocher |
| 2008/0182650 | A1 | 7/2008 | Randall et al. |
| 2008/0214292 | A1 | 9/2008 | Bryant et al. |
| 2008/0268941 | A1 | 10/2008 | Kaminkow |
| 2008/0318668 | A1 | 12/2008 | Ching et al. |
| 2008/0318688 | A1 | 12/2008 | Powell |
| 2009/0088239 | A1 | 4/2009 | Iddings et al. |
| 2009/0118004 | A1 | 5/2009 | Hoffman |
| 2009/0124347 | A1 | 5/2009 | Rodgers et al. |
| 2009/0170592 | A1 | 7/2009 | Cuddy |
| 2010/0004050 | A1 | 1/2010 | Caputo et al. |
| 2010/0022297 | A1 | 1/2010 | Saunders |
| 2010/0120506 | A1 | 5/2010 | Davis et al. |
| 2010/0124970 | A1 | 5/2010 | Pawloski et al. |
| 2011/0111824 | A1 | 5/2011 | Cuddy et al. |
| 2011/0111841 | A1 | 5/2011 | Tessmer et al. |
| 2011/0118000 | A1 | 5/2011 | Jaffe et al. |
| 2011/0130193 | A1 | 6/2011 | Belger et al. |

FOREIGN PATENT DOCUMENTS

| | | |
|---|---|---|
| EP | 1 067 491 | 1/2001 |
| GB | 2 072 395 | 9/1981 |
| GB | 2 137 392 | 10/1984 |
| GB | 2 180 682 | 4/1987 |
| GB | 2 222 712 | 3/1990 |
| GB | 2 226 436 | 6/1990 |
| WO | WO 97/32285 | 9/1997 |
| WO | WO 01/15055 | 3/2001 |
| WO | WO 01/19476 | 3/2001 |
| WO | WO 01/33478 | 5/2001 |
| WO | WO 2005/010831 | 2/2005 |
| WO | WO 2005/083599 | 9/2005 |
| WO | WO 2006/002241 | 1/2006 |
| WO | WO 2006/004831 | 1/2006 |
| WO | WO 2006/014657 | 2/2006 |
| WO | WO 2006/060436 | 6/2006 |
| WO | WO 2007/084766 | 7/2007 |
| WO | WO 2007/090270 | 8/2007 |

OTHER PUBLICATIONS

Hot Slot—The Wizard of Oz—Glinda the Good Witch and Wiked Riches, Southern California Gaming Guide, available at http://www.print2webcorp.com/news/sandiegogg/20090301/p33_s1.htm, printed Dec. 8, 2011 (1 page).

One Slot to Rule Them All . . . The Lord of the Rings, Gaming Guide, available at http://www.thegamingguide.com/slots/slot-articles/1220-one-slot-to-rule-them-all-the-lord-of-the-rings.html, printed Dec. 8, 2011 (5 pages).

Star Trek Video Slots Boldly Going Where No Slot Has Gone Before, Gaming Guide, available at http://www.thegamingguide.com/slots/slot-articles/672-star-trek-video-slots-boldly-going-where-no-slot-has-gone-before.html, printed Dec. 8, 2011 (3 pages).

* cited by examiner

GAMING SYSTEM, GAMING DEVICE, AND METHOD PROVIDING ONE OR MORE WILD REEL WAGER OPTIONS

COPYRIGHT NOTICE

A portion of the disclosure of this patent document contains or may contain material that is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming machines that provide players awards in primary or base games are well known. These gaming machines generally require a player to place a wager to activate a play of the primary game. For many of these gaming machines, any award provided to a player for a wagered-on play of a primary game is based on the player obtaining a winning symbol or a winning symbol combination and on the amount of the wager (e.g., the higher the wager, the higher the award). Winning symbols or winning symbol combinations that are less likely to occur usually provide higher awards.

For such known gaming machines, the amount of the wager placed on the primary game by the player may vary. For instance, the gaming machine may enable the player to wager a minimum number of credits, such as one credit (e.g., one cent, nickel, dime, quarter, or dollar) up to a maximum quantity of credits, such as five credits. This wager may be placed by the player a single time or multiple times in a single play of the primary game. For instance, gaming machine configured to operate a slot game may have one or more paylines, and the gaming machine may enable a player to place a wager on each payline for a single play of the slot game. Thus, it is known that a gaming machine, such as one configured to operate a slot game, may enable players to place wagers of substantially different amounts on each play of the primary game ranging, for example, from one credit up to 125 credits (e.g., 5 credits on each of twenty-five separate paylines). This is also true for other wagering games, such as video draw poker, where players can place wagers of one or more credits on each hand, and where multiple hands can be played simultaneously. Accordingly, it should be appreciated that different players play at substantially different wagering amounts or levels and at substantially different rates of play.

Various slot games include a plurality of reels, at least one of which includes a plurality of wild symbols positioned adjacent to one another on the reel to form a stack or stacks of wild symbols on the reel. During play, the reels are spun and one or more of the wild symbols of the stack or stacks of wild symbols may be generated and displayed as a result of the spin of the reels. That is, for a spin of the reels, one or more wild symbols may or may not be generated and displayed. The fact that the wild symbols are not guaranteed to be generated for each spin of the reels may frustrate players, especially those who enjoy large amounts of action and a high hit frequency while playing slot games. Accordingly, there is a continuing need to provide new wagering games that enable players to guarantee that one or more wild symbols will be generated during game play.

SUMMARY

Various embodiments of the present disclosure provide a gaming system, gaming device, and method providing one or more wild reel wager options. In general, the gaming system is configured to operate any suitable spinning reel type primary wagering game (sometimes referred to herein as the "primary game") including a plurality of reels that include a plurality of symbols. The primary game includes one or more different wild reel wager options, each of which is associated with a different one of a plurality of different wild reel wager amounts, which the gaming system enables a player to wager on a play of the primary game.

In operation, the gaming system enables a player to wager a wager amount on a play of the primary game. If the player wagers one of the different wild reel wager amounts on a play of the primary game, the gaming system determines, based on the wild reel wager option associated with the wagered wild reel wager amount, a set of one or more of the reels to be wild reels for the play of the primary game. That is, the gaming system causes each of the reels of the determined set of the reels to be wild reels for the play of the primary game. In certain embodiments, the gaming system causes each of the reels, including any wild reels, to spin and display one or more of the symbols. The gaming system determines whether the symbols displayed on the reels, including the symbols displayed on any wild reels, form any of a plurality of winning symbol combinations. If any of the winning symbol combinations are displayed on the reels, the gaming system determines any awards associated with the displayed winning symbol combinations and provides any determined awards to the player.

If the player wagers a wager amount that is not one of the different wild reel wager amounts on a play of the primary game, the gaming system causes each of the reels to spin and display one or more of the symbols. The gaming system determines whether the symbols displayed on the reels form any of the winning symbol combinations. If any of the winning symbol combinations are displayed on the reels, the gaming system determines any awards associated with the displayed winning symbol combinations and provides any determined awards to the player. Put differently, in this instance the gaming system does not cause any of the reels to be wild reels for the play of the primary game.

In certain embodiments, each of the different wild reel wager options is associated with a different one of a plurality of different predetermined sets of the reels. Each of the different predetermined sets of the reels includes at least one of the reels and, in some of these embodiments, one or more of the different predetermined sets of the reels each include two or more of the reels. In these embodiments, if a player places one of the different wild reel wager amounts on a play of the primary game, the gaming system causes each of the reels of the predetermined set of the reels associated with the wagered wild reel wager amount to be a wild reel for the play of the primary game.

It should be appreciated that, in these embodiments, the gaming system enables a player to wager one of the different wild reel wager amounts on a play of the primary game to ensure that the gaming system causes certain, specific reels of the plurality of reels to be wild reels for that play of the primary game.

In various other embodiments, each of the different wild reel wager options is associated with a different one of a plurality of different designated quantities of the reels. Each of the different designated quantities of the reels is at least one and, in some of these embodiments, one or more of the different designated quantities of the reels are greater than one. In these embodiments, if a player wagers one of the different wild reel wager amounts on a play of the primary game, the gaming system: (a) determines a set of a quantity of the reels, the quantity of the reels being equal to the designated quantity of the reels associated with the wagered wild reel wager amount; and (b) causes each of the reels of the determined set of the reels to be a wild reel for the play of the primary game.

It should be appreciated that, in these embodiments, the gaming system enables a player to wager one of the different wild reel wager amounts on a play of the primary game to ensure that the gaming system causes a certain, designated quantity of the plurality of reels to be wild reels for that play of the primary game. It should also be appreciated from the above-described example that, in these embodiments, exactly which of the reels the gaming system causes to be wild reels is not revealed until after the player has wagered the wild reel wager amount.

In certain other embodiments, the gaming system includes a single wild reel wager option associated with a wild reel wager amount. In these embodiments, if a player wagers the wild reel wager amount on a play of the primary game, the gaming system: (a) determines a quantity of one or more of the reels; (b) determines a set of a quantity of the reels, the quantity of the reels being equal to the determined quantity of the reels; and (c) causes each of the reels of the determined set of the reels to be a wild reel for the play of the primary game.

It should be appreciated that, in these embodiments, the gaming system enables a player to wager the wild reel wager amount on a play of the primary game to ensure that the gaming system causes at least one of the plurality of reels to be a wild reel for that play of the primary game. It should also be appreciated from the above-described example that, in these embodiments, exactly how many of the reels and exactly which of the reels the gaming system causes to be wild reels are not revealed until after the player has wagered the wild reel wager amount.

In various embodiments, gaming system causes one or more of the reels to be wild reels for a play of the primary game in any suitable manner. In certain embodiments, before, during, or after the spin of those reels for the play of the primary game, the gaming system replaces each of the symbols on those reels (except for bonus symbols, as described below) with wild symbols. In other embodiments, rather than replacing any symbols with wild symbols, after the spin of those reels for the play of the primary game, the gaming system treats each of the displayed symbols on those reels (except for bonus symbols, as described below) as if those symbols were wild symbols. In further embodiments, the gaming system displays, on an overlay covering those reels, a spin of wild reels including wild symbols. It should be appreciated that, in this embodiment, any bonus symbols on the covered reels are maintained in the wild reels displayed on the overlay, as described below.

In certain embodiments, the gaming system includes one or more bonus or secondary games in addition to the primary game. In certain of these embodiments, the plurality of symbols includes a bonus symbol, and the bonus game is initiated when a designated quantity of the bonus symbol are displayed on the reels following a spin of the reels. In these embodiments, when the gaming system causes certain of the reels to be wild reels for a play of the primary game, the gaming system does so without modifying the bonus symbols on those reels. That is, the gaming system causes those reels to be wild reels while ensuring that the probability of triggering the bonus game in the play of the primary game (via the display of the designated quantity of the bonus symbol) is the same as the probability of triggering the bonus game in a play of the primary game in which the gaming system does not cause any of the reels to be wild reels. It should thus be appreciated that players who wager the wild reel wager amount for a play of the primary game enjoy the same bonus game frequency as players who wager wager amounts other than the wild reel wager amounts for a play of the primary game.

Additional features and advantages are described herein, and will be apparent from, the following Detailed Description and the Figures.

DETAILED DESCRIPTION

Gaming Device and Electronics

The present disclosure may be implemented in various configurations for gaming machines, gaming devices, or gaming systems, including but not limited to: (1) a dedicated gaming machine, gaming device, or gaming system wherein the computerized instructions for controlling any games (that are provided by the gaming machine or gaming device) are provided with the gaming machine or gaming device prior to delivery to a gaming establishment; and (2) a changeable gaming machine, gaming device, or gaming system wherein the computerized instructions for controlling any games (that are provided by the gaming machine or gaming device) are downloadable to the gaming machine or gaming device through a data network after the gaming machine or gaming device is in a gaming establishment. In one embodiment, the computerized instructions for controlling any games are executed by at least one central server, central controller, or remote host. In such a "thin client" embodiment, the central server remotely controls any games (or other suitable interfaces), and the gaming device is utilized to display such games (or suitable interfaces) and receive one or more inputs or commands from a player. In another embodiment, the computerized instructions for controlling any games are communicated from the central server, central controller, or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling the base or primary game of the present disclosure are communicated from the central server to the gaming device in a thick client configuration and computerized instructions for controlling any secondary or bonus games or functions are executed by a central server in a thin client configuration.

Figure 1A:
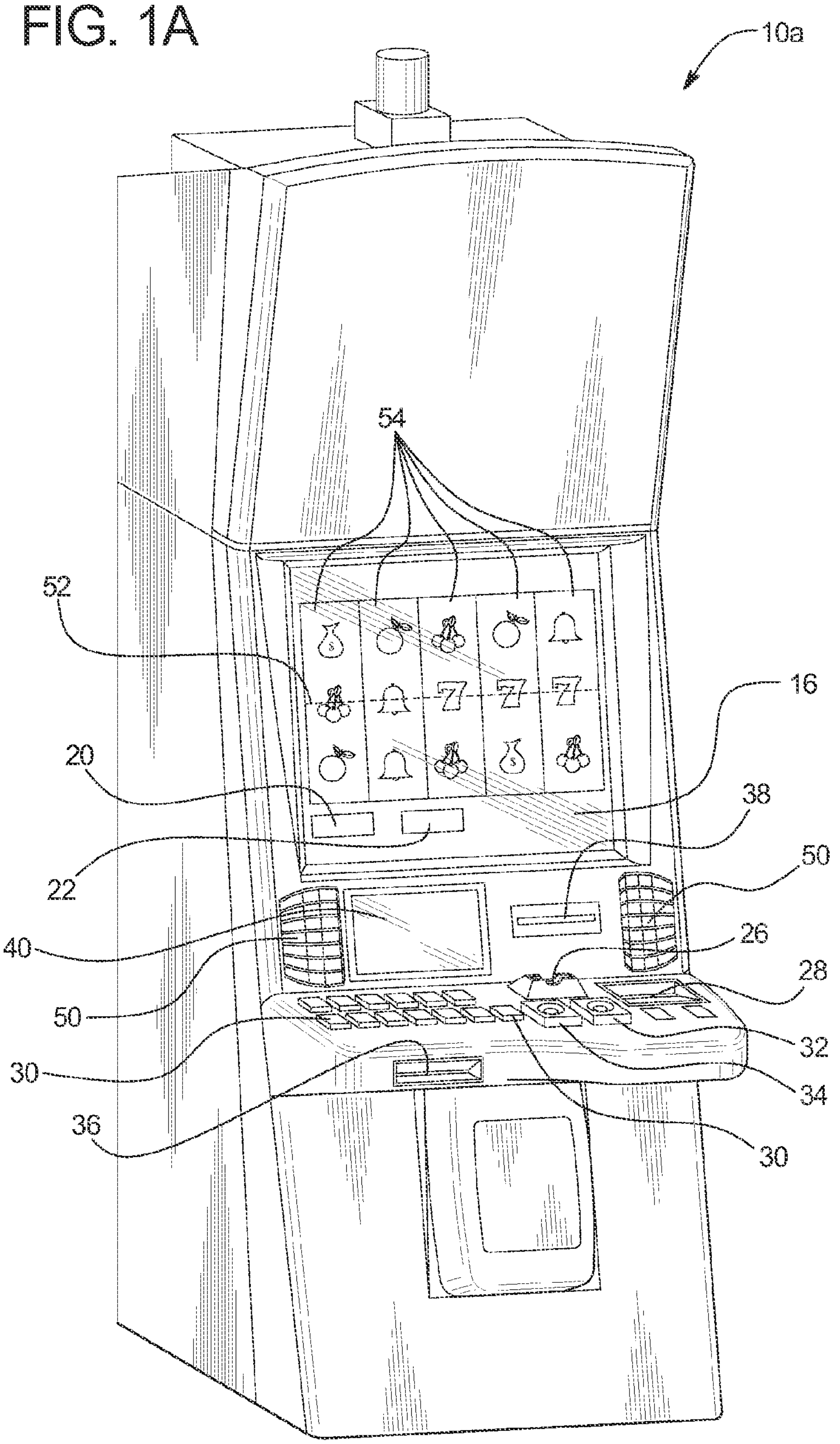
FIGS. 1A and 1B are perspective views of example alternative embodiments of a gaming device of the gaming system of the present disclosure.
Figure 1B:
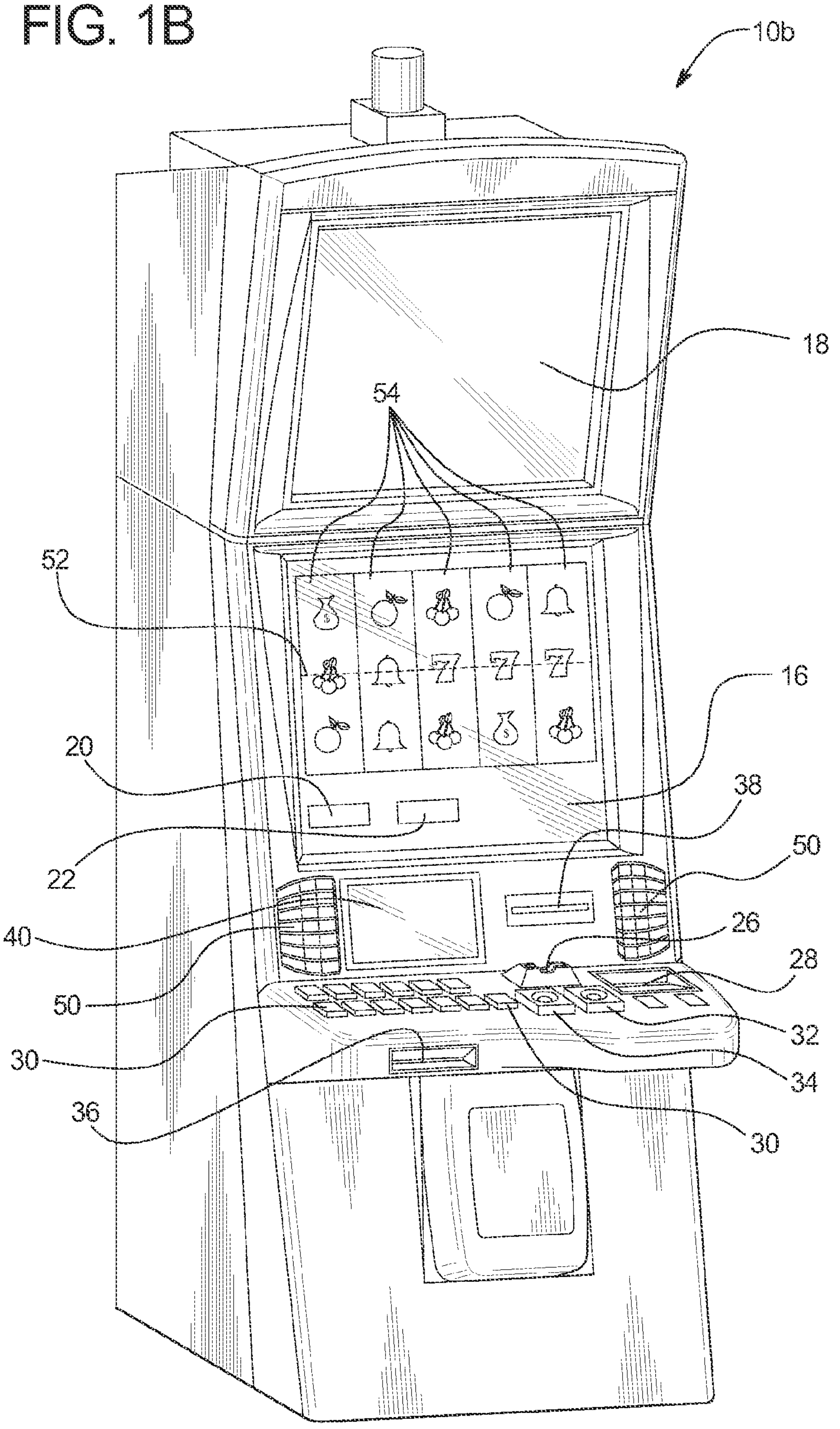

Referring now to the drawings, two example alternative embodiments of a gaming device disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing, or cabinet that provides support for a plurality of displays, inputs, controls, and other features of a conventional gaming machine. It is configured so that a player may operate it while standing or sitting. The gaming device may be positioned on a base or stand or may be configured as a pub-style table-top game (not shown) that a player may operate preferably while sitting. As illustrated by the different configurations shown in FIGS. 1A and 1B, the gaming device may have varying cabinet and display configurations.

Figure 2A:
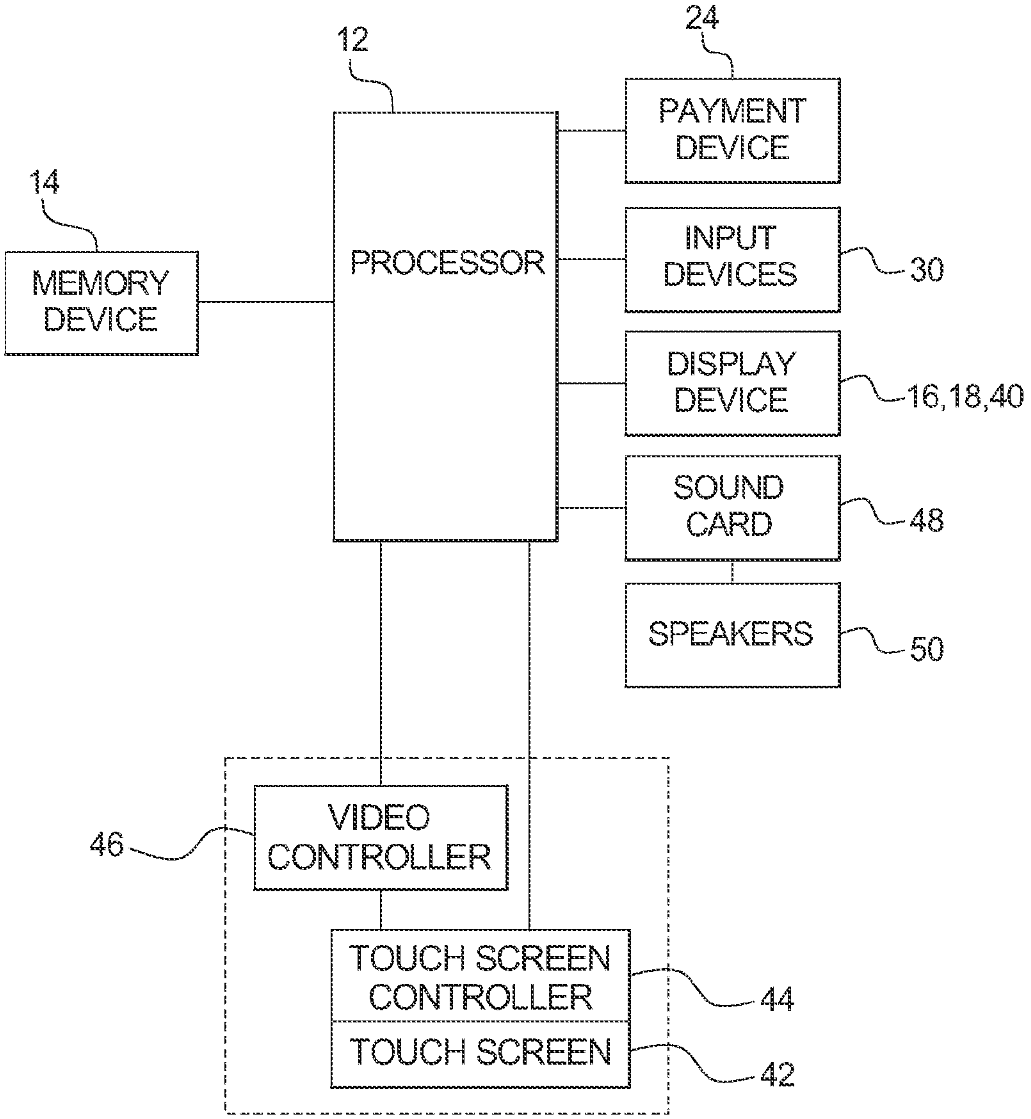
FIG. 2A is a schematic block diagram of one embodiment of an electronic configuration for one of the gaming devices of the gaming system disclosed herein.

In one embodiment, as illustrated in FIG. 2A, the gaming device includes at least one processor 12, such as a microprocessor, a microcontroller-based platform, a suitable integrated circuit, or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information, and applicable game rules that relate to the play of the gaming device. In one embodiment, the memory device includes random access memory (RAM), which may include non-volatile RAM (NVRAM), magnetic RAM (MRAM), ferroelectric RAM (FeRAM), and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical, and/or semiconductor memory may operate in conjunction with the gaming device disclosed herein.

In one embodiment, part or all of the program code and/or operating data described above may be stored in a detachable or removable memory device, such as, but not limited to, a suitable cartridge, disk, CD ROM, DVD, non-transitory computer readable medium, or USB memory device. In other embodiments, part or all of the program code and/or operating data described above may be downloaded to the memory device through a suitable network.

In one embodiment, an operator or a player may use such a removable memory device in a desktop computer, a laptop computer, a personal digital assistant (PDA), a portable computing device, or another computerized platform to implement the present disclosure. In one embodiment, the gaming device or gaming machine disclosed herein is operable over a wireless network, such as part of a wireless gaming system. In this embodiment, the gaming machine may be a hand-held device, a mobile device, or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator, or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted on the cabinet of the gaming device. The embodiment shown in FIG. 1A includes a central display device 16 that displays any suitable base or primary game. This display device may also display any suitable secondary or bonus game associated with the base or primary game as well as information relating to the base or primary game or the secondary or bonus game. The alternative embodiment shown in FIG. 1B includes a central display device 16 and an upper display device 18. The upper display device may display the base or primary game, any suitable secondary or bonus game associated or not associated with the base or primary game, and/or information relating to the base or primary game or the secondary or bonus game. These display devices may also serve as digital glass operable to advertise games or other aspects of the gaming establishment. As shown in FIGS. 1A and 1B, in one embodiment, the gaming device includes a credit display 20 that displays a player's current number of credits, cash, account balance, or the equivalent. In one embodiment, the gaming device includes a bet display 22 that displays a player's amount wagered. In one embodiment, as discussed in more detail below, the gaming device includes a player tracking display 40 that displays information regarding a player's play tracking status.

In another embodiment, at least one display device may be a mobile display device, such as a PDA or tablet PC, that enables play of at least a portion of the base or primary game or the secondary or bonus game at a location remote from the gaming device.

The display devices may include, without limitation, a monitor, a television display, a plasma display, a liquid crystal display (LCD) a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In one embodiment, as discussed in more detail below, the display device includes a touch-screen with an associated touch-screen controller. The display devices may be of any suitable size and configuration, such as a square, a rectangle, or an elongated rectangle.

The display devices of the gaming device are configured to display at least one and preferably a plurality of game or other suitable images, symbols, and indicia such as any visual representation or exhibition of the movement of objects such as mechanical, virtual, or video reels and wheels; dynamic lighting; video images; images of people, characters, places, things, or faces of cards; and the like.

In one alternative embodiment, the symbols, images, and indicia displayed on or of the display device may be in mechanical form. That is, the display device may include any electromechanical device, such as one or more mechanical objects, such as one or more rotatable wheels, reels, or dice, configured to display at least one or a plurality of game or other suitable images, symbols or indicia.

As illustrated in FIG. 2A, in one embodiment, the gaming device includes at least one payment device 24 in communication with the processor. As shown in FIGS. 1A and 1B, a payment device such as a payment acceptor includes a note, ticket, or bill acceptor 28, into which the player inserts paper money, a ticket, or voucher and a coin slot 26 into which the player inserts money, coins, or tokens. In other embodiments, payment devices such as readers or validators for credit cards, debit cards, or credit slips may accept payment. In one embodiment, a player may insert an identification card into a card reader of the gaming device. In one embodiment, the identification card is a smart card having a programmed microchip, a coded magnetic strip, or coded rewritable magnetic strip, wherein the programmed microchip or magnetic strips are coded with a player's identification, credit totals (or related data), and/or other relevant information. In another embodiment, a player may carry a portable device, such as a cell phone, a radio frequency identification tag, or any other suitable wireless device, that communicates a player's identification, credit totals (or related data), and other relevant information to the gaming device. In one embodiment, money may be transferred to a gaming device through electronic funds transfer. When a player funds the gaming device, the processor determines the amount of funds entered and displays the corresponding amount on the credit or other suitable display as discussed above.

As shown in FIGS. 1A, 1B, and 2A, in one embodiment the gaming device includes at least one and preferably a plurality of input devices 30 in communication with the processor. The input devices may include any suitable device that enables the player to produce an input signal that is received by the processor. In one embodiment, after appropriate funding of the gaming device, the input device is a game activation device, such as a play button 32 or a pull arm (not shown) that is used by the player to start the base or primary game or sequence of events in the gaming device. The play button may be any suitable play activator such as a bet one button, a max bet button, or a repeat the bet button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player may increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) that enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment, or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card or smart card, may be implemented in accordance with the gaming device disclosed herein.

In one embodiment, as mentioned above and as shown in FIG. 2A, one input device is a touch-screen 42 coupled with a touch-screen controller 44 or some other touch-sensitive display overlay to allow for player interaction with the images on the display. The touch-screen and the touch-screen controller are connected to a video controller 46. A player may make decisions and input signals into the gaming device by touching the touch-screen at the appropriate locations. One such input device is a conventional touch-screen button panel.

The gaming device may further include a plurality of communication ports for enabling communication of the processor with external peripherals, such as external video sources, expansion buses, game or other displays, a SCSI port, or a keypad.

In one embodiment, as shown in FIG. 2A, the gaming device includes a sound generating device controlled by one or more sound cards 48 that function in conjunction with the processor. In one embodiment, the sound generating device includes at least one and preferably a plurality of speakers 50 or other sound generating hardware and/or software for generating sounds, such as by playing music for the base or primary game and/or the secondary or bonus game or by playing music for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized to provide any appropriate information.

In one embodiment, the gaming machine may include a sensor, such as a camera, in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in an analog, digital, or other suitable format. The display devices may be configured to display the image acquired by the camera and to display the visible manifestation of the game in split screen or picture-in-picture fashion. For example, the camera may acquire an image of the player and the processor may incorporate that image into the base or primary game and/or the secondary or bonus game as a game image, symbol, or indicia.

Gaming device 10 incorporates the base or primary game and any secondary or bonus game associated with the base or primary game. The gaming machine or device may include some or all of the features of conventional gaming machines or devices. The gaming device may incorporate any suitable reel-type game susceptible to representation in an electronic or electromechanical form as the base or primary game. The gaming device may incorporate any suitable reel-type game, card game, cascading or falling symbol game, number game, or other game of chance susceptible to representation in an electronic or electromechanical form as a secondary or bonus game or feature, which in one embodiment produces a random outcome based on probability data at the time of or after placement of a wager. That is, different secondary or bonus games, such as video poker games, video blackjack games, video keno games, and video bingo games may be implemented.

In one embodiment, the base or primary game and/or the secondary or bonus game includes one or more paylines 52 associated with a plurality of symbol display positions. The paylines may be horizontal, vertical, circular, diagonal, angled, or any combination thereof. In this embodiment, the gaming device includes at least one and preferably a plurality of reels 54, such as three to five reels, in either electromechanical form with mechanical rotating reels or video form with simulated reels and movement thereof. In one embodiment, an electromechanical slot machine includes a plurality of adjacent, rotatable reels that may be combined and operably coupled with an electronic display of any suitable type. In another embodiment, if the reels are in video form, one or more of the display devices, as discussed above, displays the plurality of simulated video reels. Each reel displays a plurality of indicia or symbols, such as bells, hearts, fruits, numbers, letters, bars, or other images that preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels stop spinning if specified types and/or configurations of indicia or symbols occur on an active payline or otherwise occur in a winning pattern, occur on the requisite number of adjacent reels, and/or occur in a scatter pay arrangement.

In an alternative embodiment, rather than determining any outcome to provide to the player by analyzing the symbols generated on any wagered upon paylines as discussed above, the gaming device determines any outcome to provide to the player based on the number of associated symbols that are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device that enables wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels modifies the number of ways to win.

In another embodiment, the gaming device enables a player to wager on and thus activate symbol positions. In one such embodiment, the symbol positions are on the reels. In this embodiment, if a reel is activated based on the player's wager, then each of the symbol positions of that reel will be activated and each of the active symbol positions will be part of one or more of the ways to win. In one embodiment, if a reel is not activated based on the player's wager, then a designated number of default symbol positions, such as a single symbol position of the middle row of the reel, will be activated and the default symbol position(s) will be part of one or more of the ways to win. This type of gaming machine enables a player to wager on one, more than one, or all of the reels, and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as discussed above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as discussed above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols that form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of two cherry symbols as complete.

After either adding a related symbol to the first string of related symbols or marking the first string of related symbols as complete, the gaming device proceeds as discussed above for each of the remaining classified strings of related symbols that were previously classified or formed from related symbols on the first and second reels.

After analyzing each of the remaining strings of related symbols, the gaming device determines, for each remaining pending or incomplete string of related symbols, if any of the symbols from the next adjacent reel should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to a quantity of awards being based on how many paylines that would have passed through each of the strings of related symbols in active symbol positions).

In one embodiment, the secondary or bonus game may be a poker game wherein the gaming device enables the player to play a conventional game of video draw poker and initially deals five cards all face up from a virtual deck of fifty-two cards. Cards may be dealt as in a traditional game of cards or in the case of the gaming device, the cards may be randomly selected from a predetermined number of cards. If the player wishes to draw, the player selects the cards to hold via one or more input devices, such as by pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table that utilizes conventional poker hand rankings to determine the winning hands. The gaming device provides the player with an award based on a winning hand and the number of credits the player wagered.

In another embodiment, the secondary or bonus game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand against a payout table and awards are provided to the player.

In one embodiment, the secondary or bonus game may be a keno game wherein the gaming device displays a plurality of selectable indicia or numbers on at least one of the display devices. In this embodiment, the player selects at least one of a plurality of the selectable indicia or numbers via an input device such as a touch screen. The gaming device then displays a series of drawn numbers and determines an amount of matches, if any, between the player's selected numbers and the gaming device's drawn numbers. The player is provided an award based on the amount of matches, if any, based on the amount of determined matches and the number of numbers drawn.

In one embodiment, as noted above, in addition to winning credits or other awards in the base or primary game, the gaming device may also give players the opportunity to win credits in a secondary or bonus game or in a secondary or bonus round. The secondary or bonus game enables the player to obtain a prize or payout in addition to the prize or payout, if any, obtained from the base or primary game. In general, a secondary or bonus game produces a significantly higher level of player excitement than the base or primary game because it provides a greater expectation of winning than the base or primary game, and is accompanied with more attractive or unusual features than the base or primary game. In one embodiment, the secondary or bonus game may be any type of suitable game, either similar to or completely different from the base or primary game.

In one embodiment, the triggering event or qualifying condition may be a selected outcome in the base or primary game or a particular arrangement of one or more indicia on a display device in the base or primary game, such as a bonus symbol appearing on three adjacent reels along a payline in the base or primary game. In other embodiments, the triggering event or qualifying condition occurs based on exceeding a certain amount of game play (such as number of games, number of credits, amount of time), or reaching a specified number of points earned during game play.

In another embodiment, gaming device processor 12 or central controller 56 randomly provides the player one or more plays of one or more secondary or bonus games. In one such embodiment, the gaming device does not provide any apparent reason to the player for qualifying to play a secondary or bonus game. In this embodiment, qualifying for a secondary or bonus game is not triggered by an event in or based specifically on any of the plays of the base or primary game. That is, the gaming device may simply qualify a player to play a secondary or bonus game without any explanation or alternatively with simple explanations. In another embodiment, the gaming device (or central server) qualifies a player for a secondary or bonus game at least partially based on a game triggered or symbol triggered event, such as at least partially based on the play of the base or primary game.

In one embodiment, the gaming device includes a program that will automatically begin a secondary or bonus round after the player has achieved a triggering event or qualifying condition in the base or primary game. In another embodiment, after a player has qualified for a secondary or bonus game, the player may subsequently enhance the player's secondary or bonus game participation through continued play of the base or primary game. Thus, for each secondary or bonus qualifying event, such as a bonus symbol, that the player obtains, a given number of secondary or bonus game wagering points or credits may be accumulated in a "bonus meter" programmed to accrue the secondary or bonus wagering credits or entries toward eventual participation in a secondary or bonus game. The occurrence of multiple such secondary or bonus qualifying events in the base or primary game may result in an arithmetic or exponential increase in the number of secondary or bonus wagering credits awarded. In one embodiment, the player may redeem extra secondary or bonus wagering credits during the secondary or bonus game to extend play of the secondary or bonus game.

In one embodiment, no separate entry fee or buy-in for a secondary or bonus game is needed. That is, a player may not purchase entry into a secondary or bonus game; rather, the player must win or earn entry through play of the base or primary game, thus encouraging play of the base or primary game. In another embodiment, qualification of the secondary or bonus game is accomplished through a simple "buy-in" by the player—for example, if the player has been unsuccessful at qualifying through other specified activities. In another embodiment, the player must make a separate side-wager on the secondary or bonus game or wager a designated amount in the base or primary game to qualify for the secondary or bonus game. In this embodiment, the secondary or bonus game triggering event must occur and the side-wager (or designated base or primary game wager amount) must have been placed to trigger the secondary or bonus game.

Figure 2B:
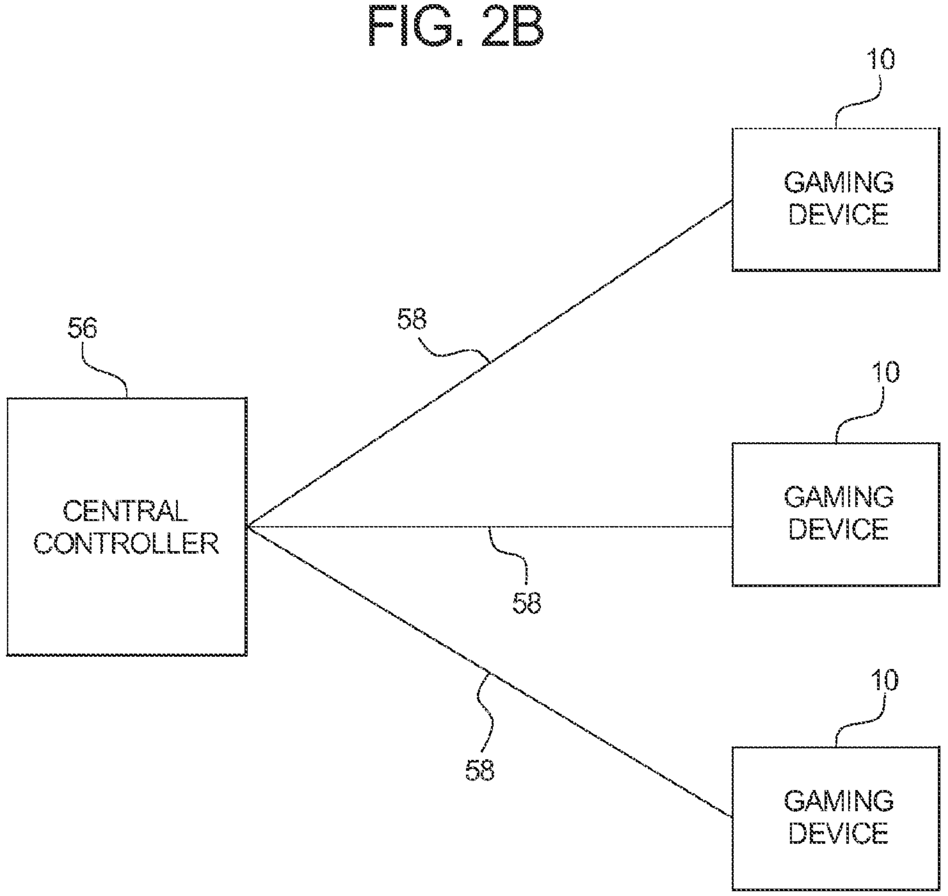
FIG. 2B is a schematic block diagram of one embodiment of a network configuration for a plurality of gaming devices of the gaming system disclosed herein.

In one embodiment, as illustrated in FIG. 2B, one or more of gaming devices 10 are in communication with each other and/or at least one central controller 56 through a data network or remote communication link 58. In this embodiment, the central server, central controller, or remote host is any suitable server or computing device that includes at least one processor and at least one memory or storage device. In different such embodiments, the central server is a progressive controller or a processor of one of the gaming devices in the gaming system. In these embodiments, the processor of each gaming device is designed to transmit and receive events, messages, commands, or any other suitable data or signal between the individual gaming device and the central server. The gaming device processor is operable to execute such communicated events, messages, or commands in conjunction with the operation of the gaming device. Moreover, the processor of the central server is designed to transmit and receive events, messages, commands, or any other suitable data or signal between the central server and each of the individual gaming devices. The central server processor is operable to execute such communicated events, messages, or commands in conjunction with the operation of the central server. It should be appreciated that one, more, or each of the functions of the central controller, central server, or remote host as disclosed herein may be performed by one or more gaming device processors. It should be further appreciated that one, more, or each of the functions of one or more gaming device processors as disclosed herein may be performed by the central controller, central server, or remote host.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the base or primary game based on probability data. In another embodiment, the central server or controller randomly generates a game outcome for the secondary or bonus game based on probability data. In another embodiment, the central server or controller randomly generates a game outcome for both the base or primary game and the secondary or bonus game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome may include a base or primary game outcome, a secondary or bonus game outcome, base or primary game and secondary or bonus game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control may assist a gaming establishment or other entity in maintaining appropriate records, controlling gaming, reducing and preventing cheating or electronic or other errors, reducing or eliminating win-loss volatility, and the like.

In another embodiment, a predetermined game outcome value is determined for each of a plurality of linked or networked gaming devices based on the results of a bingo, keno, or lottery game. In this embodiment, each individual gaming device utilizes one or more bingo, keno, or lottery games to determine the predetermined game outcome value provided to the player for the interactive game played at that gaming device. In one embodiment, the bingo, keno, or lottery game is displayed to the player. In another embodiment, the bingo, keno, or lottery game is not displayed to the player, but the results of the bingo, keno, or lottery game determine the predetermined game outcome value for the base or primary game or the secondary or bonus game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card with each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination may be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As discussed above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10, which will be provided to a first player regardless of how the first player plays in a first stage, and a second gaming device to have selected elements marked in a different predetermined pattern is provided a second outcome of win $2, which will be provided to a second player regardless of how the second player plays a second stage. It should be appreciated that as the process of marking selected elements continues until one or more predetermined patterns are marked, this embodiment ensures that at least one bingo card will win the bingo game, and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as discussed above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of whether the enrolled gaming device's provided bingo card wins or does not win the bingo game as discussed above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any player's gaming activity at the gaming device. In one such embodiment, the gaming device includes at least one card reader 38 in communication with the processor. In this embodiment, a player is issued a player identification card that has an encoded player identification number that uniquely identifies the player. When a player inserts the player's playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes the player's player tracking card when concluding play for that gaming session. In another embodiment, rather than requiring a player to insert a player tracking card, the gaming device utilizes one or more portable devices carried by a player, such as a cell phone, a radio frequency identification tag, or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) that are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to one another.

In another embodiment, the data network is an internet or intranet. In this embodiment, the operation of the gaming device may be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer or other internet facilitator is available. The expansion in the number of computers and number and speed of internet connections in recent years increases opportunities for players to play from an ever-increasing number of remote sites. It should be appreciated that the enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server-based gaming system. In one such embodiment, as discussed above, one or more gaming devices are in communication with a central server or controller. The central server or controller may be any suitable server or computing device that includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game that may be played on one or more of the gaming devices in the gaming system. Such different games may include the same or substantially the same game play with different pay tables. In different embodiments, the executable game program is for the base or primary game, a secondary or bonus game, or both. In another embodiment, the game program may be executable as a secondary or bonus game to be played simultaneous with the play of the base or primary game (that may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, or downloading or streaming the game program over a dedicated data network, internet, or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate the base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be achieved by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of the base or primary game. That is, a player is provided a progressive award without any explanation or, alternatively, with simple explanations. In another embodiment, a player is provided a progressive award at least partially based on a game triggered or symbol triggered event, such as at least partially based on the play of the base or primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager any credit amount during the base or primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the base or primary game of the gaming machines in the gaming system, via a gaming establishment or via any suitable manner.

In another embodiment, one or more of the progressive awards are partially funded via a side-bet or side-wager that the player may make (and that may be tracked via a side-bet meter). In one embodiment, one or more of the progressive awards are funded with only side-bets or side-wagers placed. In another embodiment, one or more of the progressive awards are funded based on players' wagers as discussed above as well as any side-bets or side-wagers placed.

In one alternative embodiment, a minimum wager level is required for a gaming device to qualify to be selected to obtain one of the progressive awards. In one embodiment, this minimum wager level is the maximum wager level for the base or primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as by playing together as a team or group, to win one or more awards. In one such embodiment, any award won by the group is shared, either equally or based on any suitable criteria, among the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Wild Reel Wager Options

Various embodiments of the present disclosure provide a gaming system, gaming device, and method providing one or more wild reel wager options. In general, the gaming system is configured to operate a spinning reel type, video slot type, or other suitable reel type primary wagering game (sometimes referred to herein as the "primary game"). The primary game includes a plurality of reels that include a plurality of symbols. The primary game also includes one or more different wild reel wager options. Each of the different wild reel wager options is associated with a different one of a plurality of different wild reel wager amounts, which the gaming system enables a player to wager on a play of the primary game.

In operation, the gaming system enables a player to wager a wager amount on a play of the primary game. If the player wagers one of the different wild reel wager amounts on a play of the primary game, the gaming system determines, based on the wild reel wager option associated with the wagered wild reel wager amount, a set of one or more of the reels to be wild reels for the play of the primary game. That is, the gaming system causes each of the reels of the determined set of the reels to be wild reels for the play of the primary game. The gaming system causes each of the reels, including any wild reels, to spin and display one or more of the symbols. The gaming system determines whether the symbols displayed on the reels, including the symbols displayed on any wild reels, form any of a plurality of winning symbol combinations. If any of the winning symbol combinations are displayed on the reels, the gaming system determines any awards associated with the displayed winning symbol combinations and provides any determined awards to the player.

If the player wagers a wager amount that is not one of the different wild reel wager amounts on a play of the primary game, the gaming system causes each of the reels to spin and display one or more of the symbols. The gaming system determines whether the symbols displayed on the reels form any of the winning symbol combinations. If any of the winning symbol combinations are displayed on the reels, the gaming system determines any awards associated with the displayed winning symbol combinations and provides any determined awards to the player. Put differently, in this instance the gaming system does not cause any of the reels to be wild reels for the play of the primary game.

In certain embodiments, each of the different wild reel wager options is associated with a different one of a plurality of different predetermined sets of the reels. Each of the different predetermined sets of the reels includes at least one of the reels and, in some of these embodiments, one or more of the different predetermined sets of the reels include two or more of the reels. In these embodiments, if a player places one of the different wild reel wager amounts on a play of the primary game, the gaming system causes each of the reels of the predetermined set of the reels associated with the wagered wild reel wager amount to be a wild reel for the play of the primary game.

For example, in one of these embodiments the primary game includes three reels—a first reel, a second reel, and a third reel. In this example, the primary game includes: (a) a first wild reel wager option associated with a first wild reel wager amount and a first predetermined set of the reels including the first reel, (b) a second wild reel wager option associated with a second wild reel wager amount and a second predetermined set of the reels including the second reel, (c) a third wild reel wager option associated with a third wild reel wager amount and a third predetermined set of the reels including the third reel, (d) a fourth wild reel wager option associated with a fourth wild reel wager amount and a fourth predetermined set of the reels including the first reel and the second reel, and (e) a fifth wild reel wager option associated with a fifth wild reel wager amount and a fifth predetermined set of the reels including the second reel and the third reel.

Continuing with this example, if a player wagers the fourth wild reel wager amount on a play of the primary game, the gaming system causes each of the reels of the fourth predetermined set of the reels to be a wild reel for the play of the primary game. Specifically, in this example, the gaming system causes the first reel and the second reel to be wild reels for the play of the game. The gaming system causes the first reel (which is a wild reel), the second reel (which is a wild reel), and the third reel to spin and display one or more of a plurality of symbols. The gaming system determines whether any of the displayed symbols form any winning symbol combinations, and provides the player any awards for any displayed winning symbol combinations.

It should be appreciated from the above-described example that, in these embodiments, the gaming system enables a player to wager one of the different wild reel wager amounts on a play of the primary game to ensure that the gaming system causes certain, specific reels of the plurality of reels to be wild reels for that play of the primary game.

In certain of these embodiments, the wild reel wager amounts are determined or set such that each of the wild reel wager options is associated with a desired average expected payback percentage. More specifically, in these embodiments, both the wild reel wager amounts and the average expected payback percentages associated with the wild reel wager options generally increase as the benefit to the player associated with the wild reel wager options increases. That is, in general, a wild reel wager option that is relatively more beneficial to the player is associated with a wild reel wager amount and average expected payback percentage that are each greater than a corresponding wild reel wager amount and average expected payback percentage associated with a wild reel wager option that is relatively less beneficial to the player. This incentivizes players to wager a relatively large one of the wild reel wager amounts for a play of the primary game to receive the benefit of a relatively large average expected payback percentage for that play of the game.

The gaming system may include any suitable quantity of different wild reel wager options and associated wild reel wager amounts and predetermined sets of the reels. It should be appreciated that each of the different predetermined sets of the reels may include any suitable quantity of the reels, and any suitable reels of the plurality of reels.

In various other embodiments, each of the different wild reel wager options is associated with a different one of a plurality of different designated quantities of the reels. Each of the different designated quantities of the reels is at least one and, in some of these embodiments, one or more of the different designated quantities of the reels are greater than one. In these embodiments, if a player wagers one of the different wild reel wager amounts on a play of the primary game, the gaming system: (a) determines a set of a quantity of the reels, the quantity of the reels being equal to the designated quantity of the reels associated with the wagered wild reel wager amount; and (b) causes each of the reels of the determined set of the reels to be a wild reel for the play of the primary game.

For example, in one of these embodiments the primary game includes three reels—a first reel, a second reel, and a third reel. In this example, the primary game includes: (a) a first wild reel wager option associated with a first wild reel wager amount and a first designated quantity of one of the reels, and (b) a second wild reel wager option associated with a second wild reel wager amount and a second designated quantity of two of the reels. If a player wagers the second wild reel wager amount on a play of the primary game, the gaming system: (a) determines a set of two of the reels (i.e., a set of a quantity of the reels, the quantity of the reels being equal to the second designated quantity of two the reels); and (b) causes each of the reels of the determined set of the reels to be a wild reel for the play of the primary game.

In this embodiment, the gaming system randomly determines which of the reels to include in the set of the reels. In this example, the gaming system randomly determines to include the second reel and the third reel in the set of the reels. Thus, the gaming system causes the first reel, the second reel (which is a wild reel), and the third reel (which is a wild reel) to spin and display one or more of a plurality of symbols. The gaming system determines whether any of the displayed symbols form any winning symbol combinations, and provides the player any awards for any displayed winning symbol combinations.

It should be appreciated from the above-described example that, in these embodiments, the gaming system enables a player to wager one of the different wild reel wager amounts on a play of the primary game to ensure that the gaming system causes a certain, designated quantity of the plurality of reels to be wild reels for that play of the primary game. It should also be appreciated from the above-described example that, in these embodiments, exactly which of the reels the gaming system causes to be wild reels is not revealed until after the player has wagered the wild reel wager amount.

In certain of these embodiments, the wild reel wager amounts are determined or set such that each of the wild reel wager options is associated with a desired average expected payback percentage. More specifically, in these embodiments, both the wild reel wager amounts and the average expected payback percentages associated with the wild reel wager options generally increase as the benefit to the player associated with the wild reel wager options increases. That is, in general, a wild reel wager option that is relatively more beneficial to the player is associated with a wild reel wager amount and average expected payback percentage that are each greater than a corresponding wild reel wager amount and average expected payback percentage associated with a wild reel wager option that is relatively less beneficial to the player. This incentivizes players to wager a relatively large one of the wild reel wager amounts for a play of the primary game to receive the benefit of a relatively large average expected payback percentage for that play of the game.

The gaming system may include any suitable quantity of different wild reel wager options and designated quantities of the reels. It should also be appreciated that each of the different designated quantities of the reels may be any suitable quantity.

It should be appreciated that the gaming system may determine which of the reels to include in the set of the reels in any suitable manner. For example, in various embodiments: (a) the gaming system randomly determines which of the reels to include in the set of the reels (as described in the above example); (b) the gaming system determines which of the reels to include in the set of reels based on a weighted probability table (i.e., the gaming system may be more likely to determine to include one of the reels in the set of reels than to determine to include another one of the reels in the set of reels); (c) the reels that are included in the set of the reels are predetermined; (d) the gaming system determines which of the reels to include in the set of the reels based on one or more aspects of game play; (e) the gaming system determines which of the reels to include in the set of the reels based on information stored in a player tracking account associated with the player; and (f) any suitable combination thereof.

In certain other embodiments, the gaming system includes a single wild reel wager option associated with a wild reel wager amount. In these embodiments, if a player wagers the wild reel wager amount on a play of the primary game, the gaming system: (a) determines a quantity of one or more of the reels; (b) determines a set of a quantity of the reels, the quantity of the reels being equal to the determined quantity of the reels; and (c) causes each of the reels of the determined set of the reels to be a wild reel for the play of the primary game.

For example, in one of these embodiments the primary game includes three reels—a first reel, a second reel, and a third reel. In this example, the primary game includes a first wild reel wager option associated with a first wild reel wager amount. If a player wagers the first wild reel wager amount on a play of the primary game, the gaming system: (a) determines a quantity of the reels; (b) determines a set of a quantity of the reels, the quantity of the reels being equal to the determined quantity of the reels; and (c) causes each of the reels of the determined set of the reels to be a wild reel for the play of the primary game.

In this example embodiment, the gaming system randomly determines the quantity of the reels and randomly determines which of the reels to include in the set of the reels. In this example, the gaming system randomly determines a quantity of two and randomly determines to include the second reel and the third reel in the set of the reels. Thus, the gaming system causes the first reel, the second reel (which is a wild reel), and the third reel (which is a wild reel) to spin and display one or more of a plurality of symbols. The gaming system determines whether any of the displayed symbols form any winning symbol combinations, and provides the player any awards for any displayed winning symbol combinations.

It should be appreciated from the above-described example that, in these embodiments, the gaming system enables a player to wager the wild reel wager amount on a play of the primary game to ensure that the gaming system causes at least one of the plurality of reels to be a wild reel for that play of the primary game. It should also be appreciated from the above-described example that, in these embodiments, exactly how many of the reels and exactly which of the reels the gaming system causes to be wild reels are not revealed until after the player has wagered the wild reel wager amount.

It should be appreciated that the gaming system may determine the quantity of the reels in any suitable manner. For example, in various embodiments: (a) the gaming system randomly determines the quantity of the reels (as described in the above example); (b) the quantity of the reels is predetermined; (c) the gaming system determines the quantity of the reels based on a weighted probability table (i.e., the gaming system may be more likely to determine one quantity of the reels than to determine another quantity of the reels); (d) the gaming system determines the quantity of reels based on one or more aspects of game play; (e) the gaming system determines the quantity of reels based on information stored in a player tracking account associated with the player; or (f) any suitable combination thereof.

It should further be appreciated that the gaming system may determine which of the reels to include in the set of the reels in any suitable manner. For example, in various embodiments: (a) the gaming system randomly determines which of the reels to include in the set of the reels (as described in the above example); (b) the gaming system determines which of the reels to include in the set of reels based on a weighted probability table (i.e., the gaming system may be more likely to determine to include one of the reels in the set of reels than to determine to include another one of the reels in the set of reels); (c) the reels that are included in the set of the reels are predetermined; (d) the gaming system determines which of the reels to include in the set of the reels based on one or more aspects of game play; (e) the gaming system determines which of the reels to include in the set of the reels based on information stored in a player tracking account associated with the player; and (f) any suitable combination thereof.

In certain of these embodiments, the gaming system includes a weighted probability table, and the gaming system employs the weighted probability table to determine both (a) the quantity of the reels, and (b) which of the reels to include in the set of the reels. Specifically, in these embodiments, the weighted probability table includes a plurality of entries, each of which is associated with: (a) a set of one or more reels, and (b) a probability of being selected. In these embodiments, when the player wagers the wild reel wager amount on a play of the primary game, the gaming system determines one of the entries based on the probabilities of being selected included in the weighted probability table. The gaming system causes each reel of the set of one or more reels associated with the determined entry to be a wild reel for that play of the primary game. It should thus be appreciated that, in these embodiments, the gaming system makes a single determination (i.e., determines one of the entries in the weighted probability table) to determine which reels will be wild reels rather than multiple determinations (i.e., determine a quantity of reels and determine which of the reels to include in the set of the reels). It should also be appreciated that the weighted probability table may include any suitable quantity of entries, and that each set of one or more of the reels associated with each entry may be associated with any suitable quantity of the reels and any suitable specific reels. It should further be appreciated that each of the entries may be associated with any suitable probability of being selected.

It should be appreciated that the gaming system may cause one or more of the reels to be wild reels for a play of the primary game in any suitable manner. In one embodiment, before, during, or after the spin of those reels for the play of the primary game, the gaming system replaces each of the symbols on those reels (except for bonus symbols, as described below) with wild symbols. In another embodiment, rather than replacing any symbols with wild symbols, after the spin of those reels for the play of the primary game, the gaming system treats each of the displayed symbols on those reels (except for bonus symbols, as described below) as if those symbols were wild symbols. In a further embodiment, the gaming system displays, on an overlay covering those reels, a spin of wild reels including wild symbols. It should be appreciated that, in this embodiment, any bonus symbols on the covered reels are maintained in the wild reels displayed on the overlay, as described below.

In various embodiments, the gaming system includes one or more bonus or secondary games in addition to the primary game. In certain of these embodiments, the plurality of symbols includes a bonus symbol, and the bonus game is initiated when a designated quantity of the bonus symbol are displayed on the reels following a spin of the reels. In these embodiments, when the gaming system causes certain of the reels to be wild reels for a play of the primary game, the gaming system does so without modifying the bonus symbols on those reels. That is, the gaming system causes those reels to be wild reels while ensuring that the probability of triggering the bonus game in the play of the primary game (via the display of the designated quantity of the bonus symbol) is the same as the probability of triggering the bonus game in a play of the primary game in which the gaming system does not cause any of the reels to be wild reels. It should thus be appreciated that players who wager the wild reel wager amount for a play of the primary game enjoy the same bonus game frequency as players who wager wager amounts other than the wild reel wager amounts for a play of the primary game.

In certain of these embodiments, the bonus game is a free spin game that provides the player with a quantity of free spins of the reels. In some of these embodiments, the gaming system causes one or more of the reels that the gaming system caused to be wild reels for the play of the primary game to be wild reels in one or more of the free spins of the free spin game.

In various embodiments, the gaming system includes a combination of one or more of the above-described embodiments. For example, in one embodiment, the gaming system includes: (a) a plurality of different first wild reel wager amounts, each of which is associated with a different one of a plurality of different sets of one or more reels; (b) a plurality of different second wild reel wager amounts, each of which is associated with a different one of a plurality of different designated quantities of the reels; and (c) a third wild reel wager amount. It should thus be appreciated that, in this embodiment, the player may wager: (a) one of the first wild reel wager amounts to ensure that the gaming system causes certain specific reels to be wild reels, (b) one of the second wild reel wager amounts to ensure that the gaming system will cause a designated quantity of the reels to be wild reels (without knowing which specific reels will be wild reels), or (c) the third wild reel wager amount to ensure that the gaming system causes at least one of the reels to be a wild reel (without knowing how many reels or which specific reels will be wild reels).

Figure 3A:
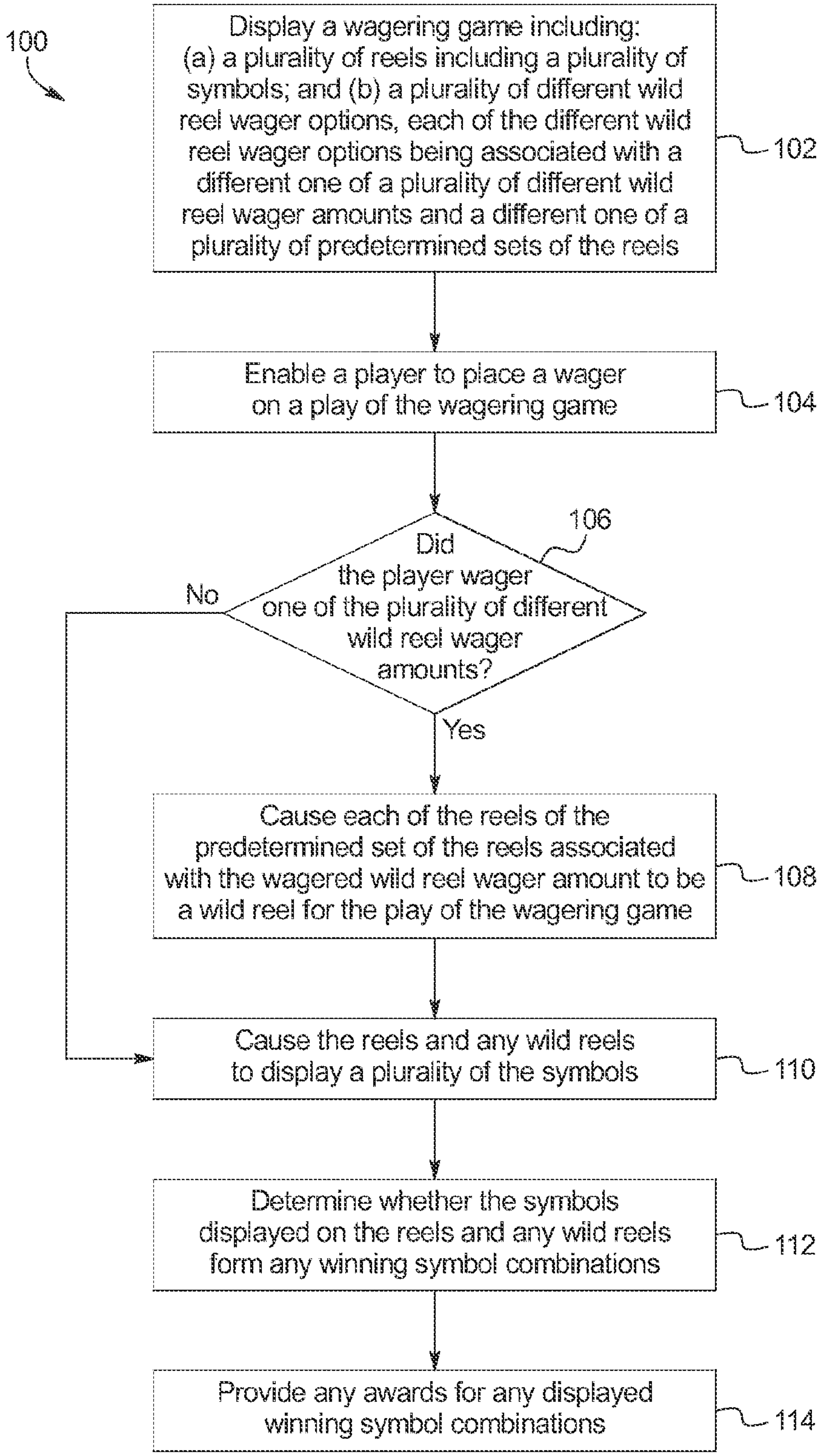
FIG. 3A is a flowchart illustrating an example method of operating a gaming system of one embodiment of the present disclosure in which the primary game includes: (a) a plurality of reels; and (b) a plurality of different wild reel wager options, each of which is associated with a different one of a plurality of different wild reel wager amounts and a different one of a plurality of different predetermined sets of the reels.

FIG. 3A illustrates a flowchart of an example of a process or method 100 for operating a gaming system of the present disclosure that is configured to operate a spinning reel type primary game including: (a) a plurality of reels; and (b) a plurality of different wild reel wager options, each of which is associated with a different one of a plurality of different wild reel wager amounts and a different one of a plurality of different predetermined sets of the reels.

In one embodiment, this process 100 is represented by a set of instructions stored in one or more memories and executed by one or more processors or controllers. Although this process 100 is described with reference to the flowchart shown in FIG. 3A, it should be appreciated that many other processes of performing the acts associated with this illustrated process may be employed. For example, the order of certain of the illustrated blocks and/or diamonds may be changed, certain of the illustrated blocks and/or diamonds may be optional, and/or certain of the illustrated blocks and/or diamonds may not be employed.

In operation of one embodiment, the gaming system displays a wagering game including: (a) a plurality of reels including a plurality of symbols; and (b) a plurality of different wild reel wager options, as indicated by block 102. Each of the different wild reel wager options is associated with a different one of a plurality of different wild reel wager amounts and a different one of a plurality of predetermined sets of the reels. The gaming system enables a player to place a wager on a play of the wagering game, as indicated by block 104. The gaming system determines whether the player wagered one of the different wild reel wager amounts, as indicated by diamond 106. If the player did not wager one of the different wild reel wager amounts, process 100 proceeds to block 110, as further described below.

If the player wagered one of the different wild reel wager amounts, the gaming system causes each of the reels of the predetermined set of the reels associated with the wagered wild reel wager amount to be a wild reel for the play of the wagering game, as indicated by block 108. The gaming system causes the reels and any wild reels to display a plurality of the symbols, as indicated by block 110. The gaming system determines whether the symbols displayed on the reels and any wild reels form any winning symbol combinations, as indicated by block 112. The gaming system provides any awards for any displayed winning symbol combinations, as indicated by block 114.

FIGS. 4A, 4B, 4C, 4D, and 4E illustrate screen shots of one embodiment of the gaming system, gaming device, and method of the present disclosure configured to operate the above-described embodiment of the primary game. More specifically, in this example, the primary game is a spinning reel type game including: (a) a plurality of reels including a plurality of symbols; and (b) a plurality of different wild reel wager options, each of which is associated with a different one of a plurality of different wild reel wager amounts and a different one of a plurality of different predetermined sets of the reels. In this example, the plurality of symbols includes a bonus symbol. When three of the bonus symbol are generated and displayed along a wagered-on payline following a spin of the reels, the gaming system initiates a bonus game.

In this example, the gaming system includes a display device 120 that displays a plurality of reels 130*a*, 130*b*, 130*c*, 130*d*, and 130*e*. Each of reels 130*a*, 130*b*, 130*c*, 130*d*, and 130*e* includes a plurality of the symbols. Display device 120 also displays a plurality of symbol display areas 131*a*, 131*b*, 131*c*, 131*d*, 131*e*, 131*f*, 131*g*, 131*h*, 131*i*, 131*j*, 131*k*, 131*l*, 131*m*, 131*n*, and 131*o*. Reel 130*a* displays symbols at symbol display areas 131*a*, 131*f*, and 131*k*; reel 130*b* displays symbols at symbol display areas 131*b*, 131*g*, and 131*l*; reel 130*c* displays symbols at symbol display areas 131*c*, 131*h*, and 131*m*; reel 130*d* displays symbols at symbol display areas 131*d*, 131*i*, and 131*n*; and reel 130*e* displays symbols at symbol display areas 131*e*, 131*j*, and 131*o*.

Display device 120 displays a plurality of paylines for the primary game, each of which is associated with a different plurality of the symbol display areas. Specifically, payline A 132*a* is associated with symbol display areas 131*a*, 131*b*, 131*c*, 131*d*, and 131*e*; payline B 132*b* is associated with symbol display areas 131*a*, 131*b*, 131*h*, 131*n*, and 131*o*; payline C 132*c* is associated with symbol display areas 131*f*, 131*g*, 131*h*, 131*i*, and 131*j*; payline D 132*d* is associated with symbol display areas 131*k*, 131*l*, 131*h*, 131*d*, and 131*e*; and payline E 132*e* is associated with symbol display areas 131*k*, 131*l*, 131*m*, 131*n*, and 131*o*. Payline A 132*a*, payline B 132*b*, payline C 132*c*, payline D 132*d*, and payline E 132*e* are sometimes referred to herein as paylines A, B, C, D, and E.

Display device 120 displays a paytable 122 for the primary game that includes a plurality of winning symbol combinations. Paytable 122 indicates the credit payout associated with each respective winning symbol combination. In this illustrated example, paytable 122 indicates the credit payout associated with each respective winning symbol combination when the maximum wager, which is 30 credits in this example (but could be any suitable amount), is placed by a player for a play of the primary game. More specifically, winning symbol combination SEVEN-SEVEN-SEVEN-SEVEN-SEVEN is associated with an award of 10,000 credits; winning symbol combination DOLLAR SIGN-DOLLAR SIGN-DOLLAR SIGN-DOLLAR SIGN-DOLLAR SIGN is associated with an award of 5,000 credits; winning symbol combination TRIPLE BAR-TRIPLE BAR-TRIPLE BAR-TRIPLE BAR is associated with an award of 2,000 credits; winning symbol combination ORANGE-ORANGE-ORANGE-ORANGE is associated with an award of 500 credits; and winning symbol combination BAR-BAR-BAR is associated with an award of 100 credits.

Display device 120 also displays a wild reel bet option indicator 150, which indicates each of the wild reel bet options and their associated wild reel wager amounts. That is, in this example, wild reel bet option indicator 150 indicates the predetermined set of the reels and the wild reel wager amount associated with each available wild reel bet option. It should be appreciated that, in this example, wild reel bet option indicator 150 indicates the wild reel wager amounts associated with each respective wild reel bet option when all of paylines A, B, C, D, and E are being wagered on. That is, the wild reel wager amounts may differ if the player desires to wager one of the wild reel wager amounts on fewer than all of the paylines. Wild reel bet option indicator 150 indicates the following wild reel bet options: (a) a Reel 1 Wild wild reel bet option associated with a predetermined set of the reels including reel 130*a* and a wild reel wager amount of 210 credits; (b) a Reel 2 Wild wild reel bet option associated with a predetermined set of the reels including reel 130*b* and a wild reel wager amount of 160 credits; (c) a Reel 3 Wild wild reel bet option associated with a predetermined set of the reels including reel 130*c* and a wild reel wager amount of 180 credits; (d) a Reel 4 Wild wild reel bet option associated with a predetermined set of the reels including reel 130*d* and a wild reel wager amount of 80 credits; (e) a Reel 5 Wild wild reel bet option associated with a predetermined set of the reels including reel 130*e* and a wild reel wager amount of 60 credits; (f) a Reels 1 and 2 Wild wild reel bet option associated with a predetermined set of the reels including reel 130*a* and reel 130*b* and a wild reel wager amount of 1,200 credits; (g) a Reels 2 and 3 Wild wild reel bet option associated with a predetermined set of the reels including reel 130*b* and reel 130*c* and a wild reel wager amount of 860 credits; (h) a Reels 3 and 4 Wild wild reel bet option associated with a predetermined set of the reels including reel 130*c* and reel 130*d* and a wild reel wager amount of 480 credits; (i) a Reels 1 and 5 Wild wild reel bet option associated with a predetermined set of the reels including reel 130*a* and reel 130*e* and a wild reel wager amount of 420 credits; and (j) a Reels 4 and 5 Wild wild reel bet option associated with a predetermined set of the reels including reel 130*d* and reel 130*e* and a wild reel wager amount of 85 credits.

It should be appreciated that the gaming system may enable the player to wager one of the wild reel wager amounts in any suitable manner. In one embodiment, the gaming system includes a touch screen and the gaming system enables the player to wager one of the wild reel wager amounts by touching a designated area of the touch screen that is associated with that wild reel wager amounts. In another embodiment, the gaming system includes a different dedicated button associated with each wild reel wager amount. In this embodiment, the gaming system enables the player to wager one of the wild reel wager amounts by actuating the dedicated button associated with that wild reel wager amount. It should be appreciated that the gaming system may enable the player to wager one of the wild reel wager amounts in any other suitable manner using any other suitable input device.

It should be also appreciated that, in various embodiments: (a) the primary game may include, and the display device may display, any suitable quantity of reels including any suitable quantity of corresponding symbol display areas in any suitable configuration or arrangement; (b) the primary game may include, and the display device may display, any suitable quantity of paylines for the primary game; (c) each of the displayed paylines may be associated with any suitable quantity of the symbol display areas and any suitable combination of the symbol display areas; (d) any other suitable award determination other than a payline evaluation may be used, such as a ways to win and/or a scatter pay award determination (described in detail above); (e) the paytable may be modified to reflect lower credit payouts when a wager that is less than the maximum wager is placed by the player for the wagering game; (f) any suitable paytable including any suitable quantity of winning symbol combinations may be employed; (g) any suitable combination of the symbols may be used as a winning symbol combination; (h) the winning symbol combinations may be associated with any suitable credit payouts; (i) any suitable quantity of paytables may be utilized; (j) any suitable symbols may be employed and may include, for example, any suitable markings or indicia such as letters, numbers, or illustrations or pictures of objects; (k) the display device does not display the wild reel bet option indicator; (l) the wild reel bet option indicator is displayed elsewhere on the gaming system; (m) the primary game may include, and the display device may display, any suitable quantity of wild reel bet options; and (n) the wild reel wager amounts may be lowered if the player desires to wager one of the wild reel wager amounts on fewer than all of the paylines.

Display device 120 displays an indication, notification, or message display area 121, which displays information, notifications, and/or messages before, during, or after play; a credit meter 124, which indicates the player's credit balance; a wager indicator or display 128, which indicates any wager placed by the player for a play of the primary game; and an award indicator or display 126, which indicates any award a player has won during a play of the primary game.

Figure 4A:
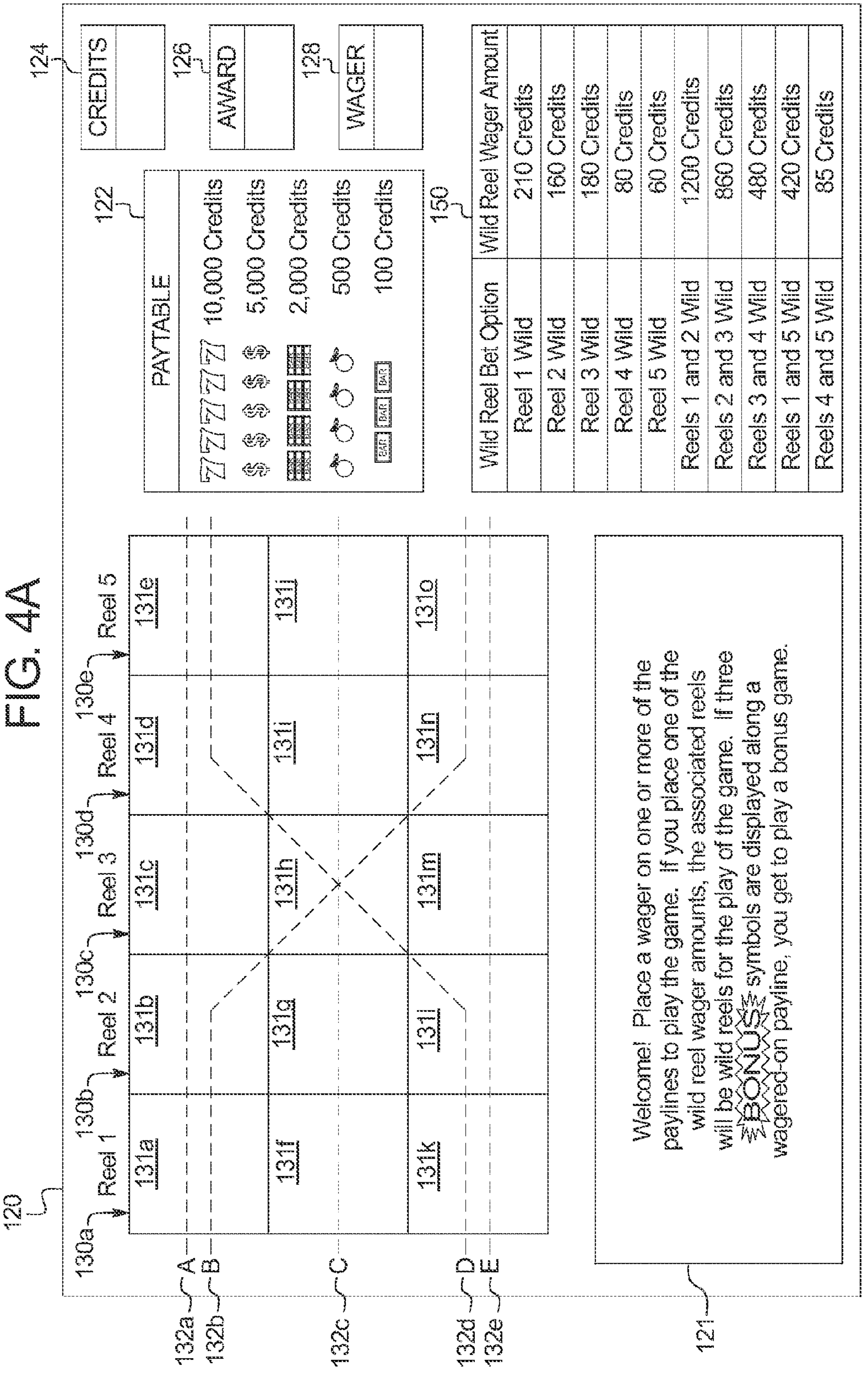
FIGS. 4A, 4B, 4C, 4D, and 4E are front views of a display device of the gaming system of one embodiment of the present disclosure, and illustrate example plays of an embodiment of the primary game including: (a) a plurality of reels; and (b) a plurality of different wild reel wager options, each of which is associated with a different one of a plurality of different wild reel wager amounts and a different one of a plurality of different predetermined sets of the reels.

As illustrated in FIG. 4A, when the gaming system is not being played, message display area 121 displays a message that invites a player to place a wager on one or more paylines for a play of the primary game. The message notifies the player that if three of the bonus symbol are generated and displayed along a wagered-on payline, the player will get to play a bonus game.

Figure 4B:
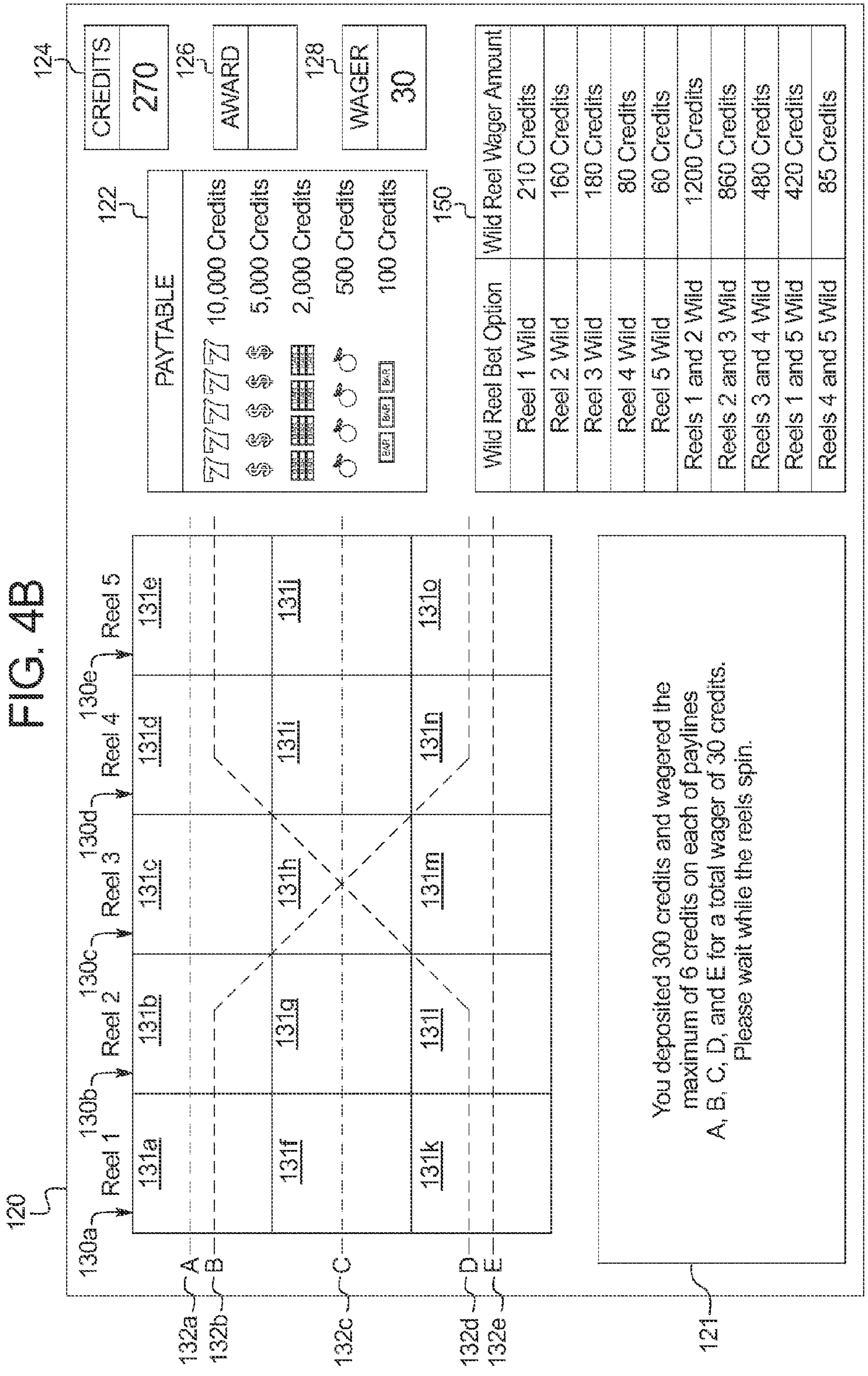

As illustrated in FIG. 4B, the player deposits currency and is provided with 300 credits. As displayed in message display area 121, the player initiates a play of the primary game by placing the maximum wager of 30 credits, which activates each of paylines A, B, C, D, and E. The player's wager of 30 credits is indicated in wager indicator 128. The player's total remaining credit balance of 270 credits (i.e., the player's initial credit balance of 300 credits minus the player's wager of 30 credits) is indicated in credit meter 124.

Figure 4C:
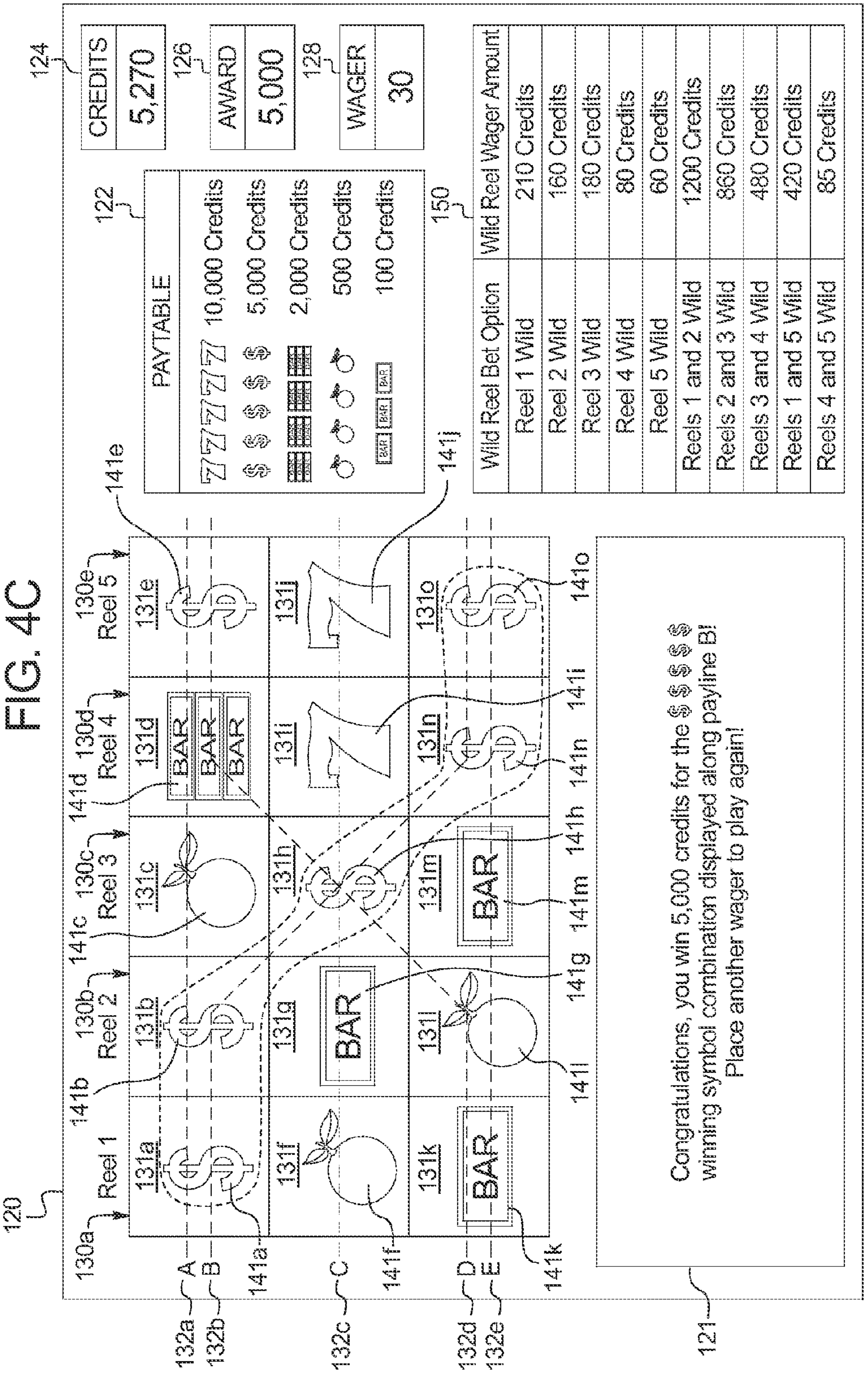

As illustrated in FIG. 4C: (a) reel 130*a* spins and displays symbols 141*a*, 141*f*, and 141*k* at symbol display areas 131*a*, 131*f*, and 131*k*, respectively; (b) reel 130*b* spins and displays symbols 141*b*, 141*g*, and 141*l* at symbol display areas 131*b*, 131*g*, and 131*l*, respectively; (c) reel 130*c* spins and displays symbols 141*c*, 141*h*, and 141*m* at symbol display areas 131*c*, 131*h*, and 131*m*, respectively; (d) reel 130*d* spins and displays symbols 141*d*, 141*i*, and 141*n* at symbol display areas 131*d*, 131*i*, 131*n*, respectively; and (e) reel 130*e* spins and displays symbols 141*e*, 141*j*, and 1410 at symbol display areas 131*e*, 131*j*, and 131*o*, respectively. As indicated by the message displayed in message display area 121, the player wins 5,000 credits for the DOLLAR SIGN-DOLLAR SIGN-DOLLAR SIGN-DOLLAR SIGN-DOLLAR SIGN winning symbol combination displayed along payline B. Accordingly, the 5,000 credit award is indicated in award indicator 126. The player's new credit balance of 5,270 credits (which reflects the player's previous credit balance of 270 credits plus the 5,000 credit award) is indicated by credit meter 124.

Figure 4D:
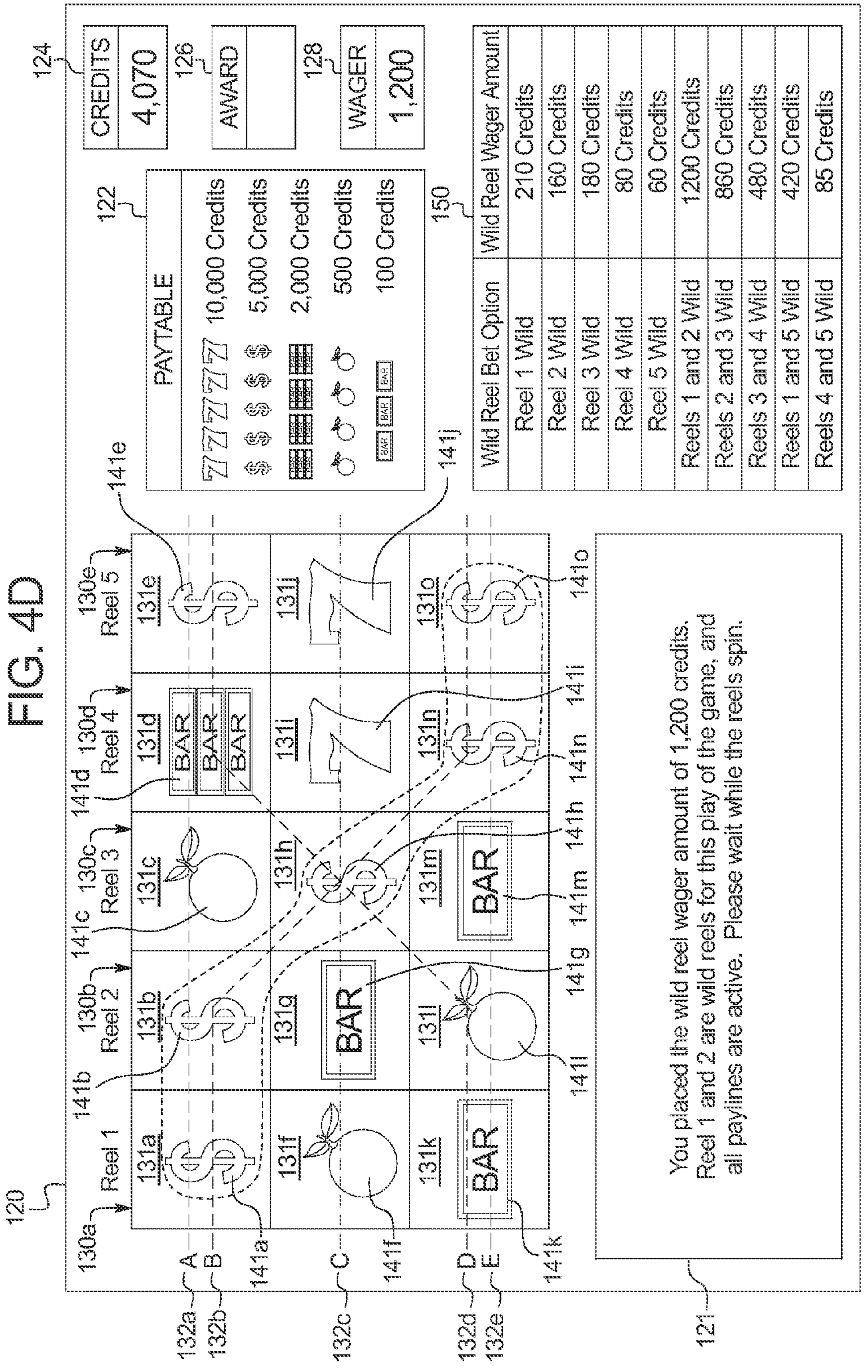

As illustrated in FIG. 4D, the player places another wager for another play of the primary game. Specifically, the player wagers the wild reel wager amount of 1,200 credits associated with the Reels 1 and 2 Wild wild reel wager option included in wild reel wager option indicator 150. Thus, as indicated by the message displayed in message display area 121, the gaming system will cause reel 130*a* and reel 130*b* (i.e., Reels 1 and 2 in this example) to be wild reels for this play of the primary game. The player's wager of 1,200 credits is indicated in wager indicator 128. The player's total remaining credit balance of 4,070 credits (i.e., the player's previous credit balance of 5,270 credits minus the player's wager of 1,200 credits) is indicated in credit meter 124. It should be appreciated that, in this example, all paylines (i.e., paylines A, B, C, D, and E) are active when the player places one of the wild reel wager amounts. Additionally, in this embodiment, the gaming system causes a reel to be a wild reel by replacing all of the symbols on the reel, except for any bonus symbols, with wild symbols.

Figure 4E:
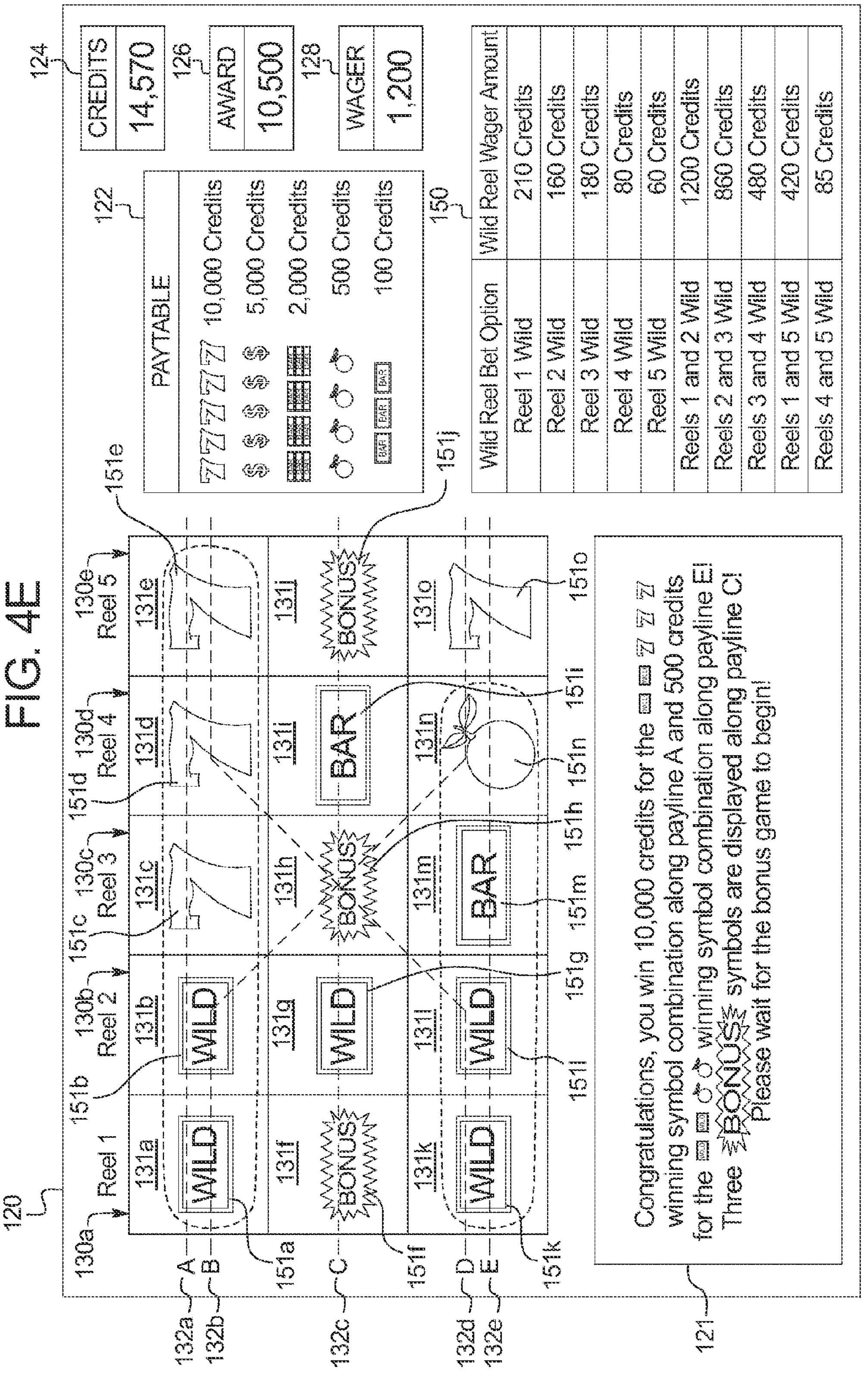

As illustrated in FIG. 4E: (a) reel 130*a* spins and displays symbols 151*a*, 151*f*, and 151*k* at symbol display areas 131*a*, 131*f*, and 131*k*, respectively; (b) reel 130*b* spins and displays symbols 151*b*, 151*g*, and 151*l* at symbol display areas 131*b*, 131*g*, and 131*l*, respectively; (c) reel 130*c* spins and displays symbols 151*c*, 151*h*, and 151*m* at symbol display areas 131*c*, 131*h*, and 131*m*, respectively; (d) reel 130*d* spins and displays symbols 151*d*, 151*i*, and 151*n* at symbol display areas 131*d*, 131*i*, 131*n*, respectively; and (e) reel 130*e* spins and displays symbols 151*e*, 151*j*, and 1510 at symbol display areas 131*e*, 131*j*, and 131*o*, respectively. As indicated by the message displayed in message display area 121, the player wins 10,000 credits for the WILD-WILD-7-7-7 winning symbol combination (which is considered to be a 7-7-7-7-7 winning symbol combination by virtue of the wild symbols) displayed along payline A; and 500 credits for the WILD-WILD-ORANGE-ORANGE winning symbol combination (which is considered to be an ORANGE-ORANGE-ORANGE-ORANGE winning symbol combination by virtue of the wild symbols) along payline E. Accordingly, the 10,500 credit award is indicated in award indicator 126. The player's new credit balance of 14,570 credits (which reflects the player's previous credit balance of 4,070 credits plus the 10,500 credit award) is indicated by credit meter 124. Additionally, three bonus symbols 151*f*, 151*h*, and 151*j* were generated and displayed along payline C. Accordingly, the gaming system will initiate the bonus game, and message display area 121 displays a message instructing the player to wait while the gaming system initiates the bonus game. It should thus be appreciated that, in this example, when the gaming system causes certain of the reels to be wild reels, the gaming system does not eliminate the bonus symbols on those reels.

Figure 3B:
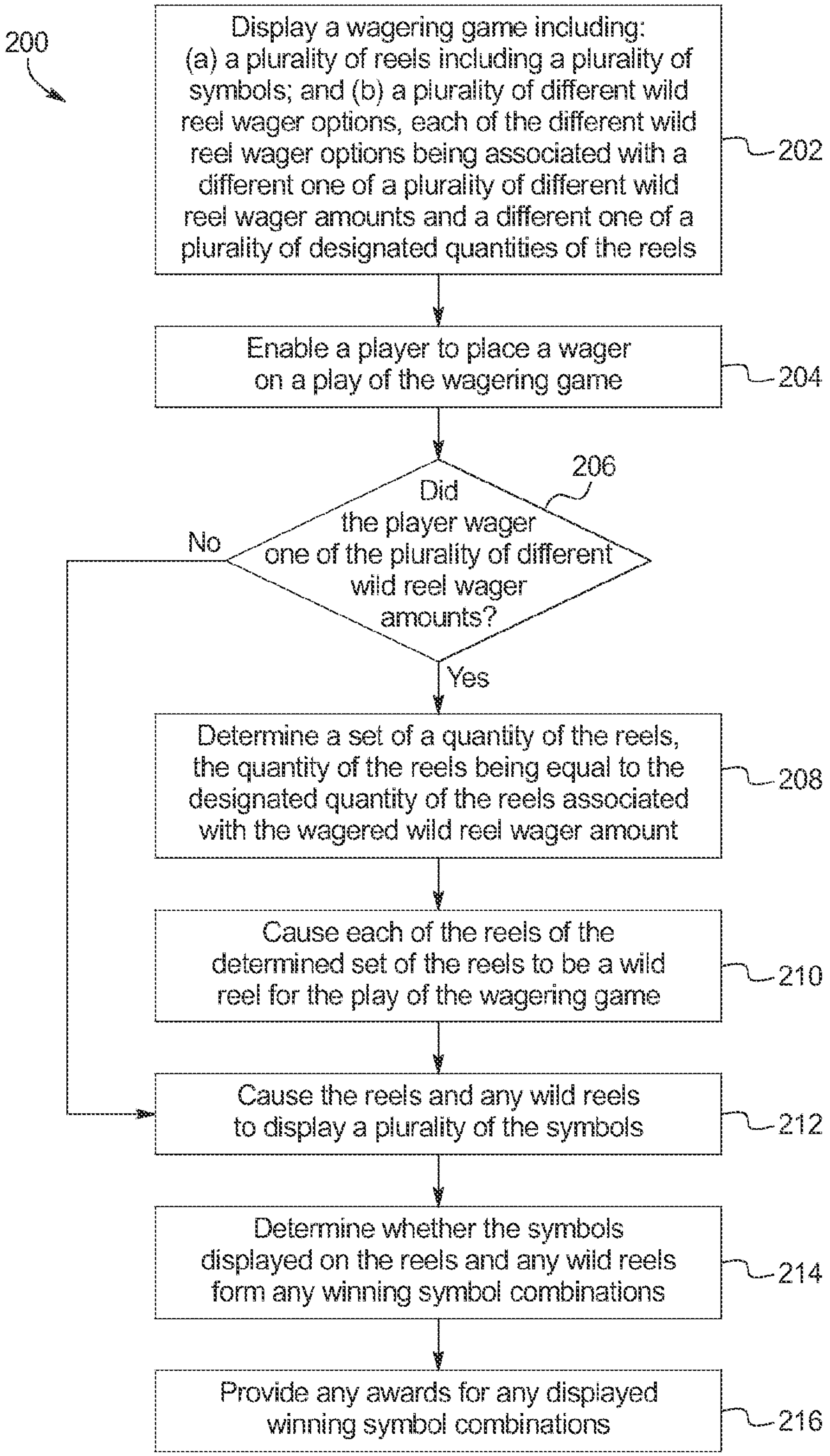
FIG. 3B is a flowchart illustrating an example method of operating a gaming system of another embodiment of the present disclosure in which the primary game includes: (a) a plurality of reels; and (b) a plurality of different wild reel wager options, each of which is associated with a different one of a plurality of different wild reel wager amounts and a different one of a plurality of different designated quantities of the reels.

FIG. 3B illustrates a flowchart of an example of a process or method 200 for operating a gaming system of the present disclosure that is configured to operate another embodiment of the spinning reel type primary game including: (a) a plurality of reels; and (b) a plurality of different wild reel wager options, each of which is associated with a different one of a plurality of different wild reel wager amounts and a different one of a plurality of different designated quantities of the reels.

In one embodiment, this process 200 is represented by a set of instructions stored in one or more memories and executed by one or more processors or controllers. Although this process 200 is described with reference to the flowchart shown in FIG. 3B, it should be appreciated that many other processes of performing the acts associated with this illustrated process may be employed. For example, the order of certain of the illustrated blocks and/or diamonds may be changed, certain of the illustrated blocks and/or diamonds may be optional, and/or certain of the illustrated blocks and/or diamonds may not be employed.

In operation of one embodiment, the gaming system displays a wagering game including: (a) a plurality of reels including a plurality of symbols; and (b) a plurality of different wild reel wager options, as indicated by block 202. Each of the different wild reel wager options is associated with a different one of a plurality of different wild reel wager amounts and a different one of a plurality of different quantities of the reels. The gaming system enables a player to place a wager on a play of the wagering game, as indicated by block 204. The gaming system determines whether the player wagered one of the different wild reel wager amounts, as indicated by diamond 206. If the player did not wager one of the different wild reel wager amounts, process 200 proceeds to block 212, as further described below.

If the player wagered one of the different wild reel wager amounts, the gaming system determines a set of a quantity of the reels, as indicated by block 208. The quantity of the reels is equal to the designated quantity of the reels associated with the wagered wild reel wager amount. The gaming system causes each of the reels of the determined set of the reels to be a wild reel for the play of the wagering game, as indicated by block 210. The gaming system causes the reels and any wild reels to display a plurality of the symbols, as indicated by block 212. The gaming system determines whether the symbols displayed on the reels and any wild reels form any winning symbol combinations, as indicated by block 214. The gaming system provides any awards for any displayed winning symbol combinations, as indicated by block 216.

Figure 5A:
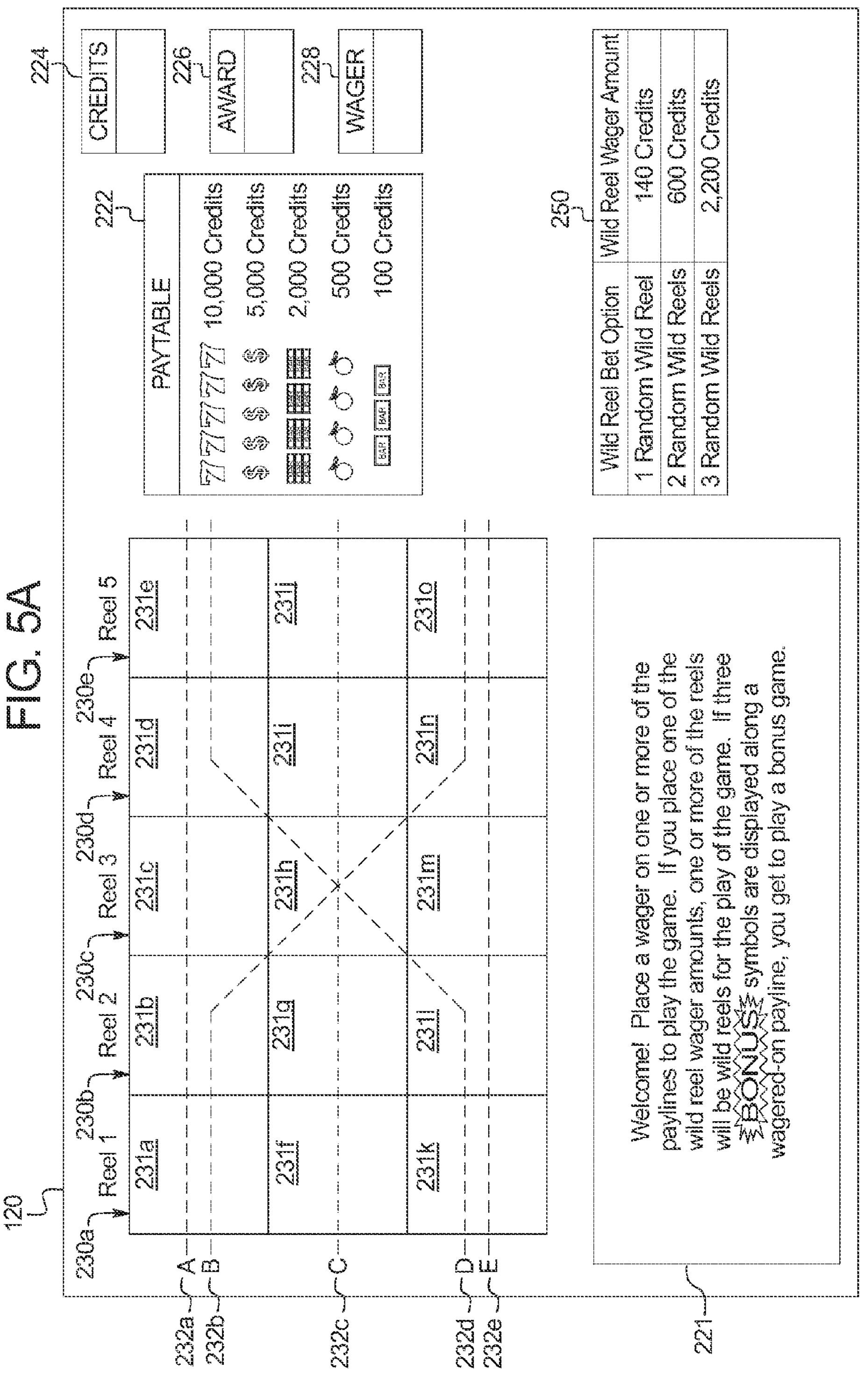
FIGS. 5A, 5B, and 5C are front views of a display device of the gaming system of another embodiment of the present disclosure, and illustrate an example play of an embodiment of the primary game including: (a) a plurality of reels; and (b) a plurality of different wild reel wager options, each of which is associated with a different one of a plurality of different wild reel wager amounts and a different one of a plurality of different designated quantities of the reels.
Figure 5B:
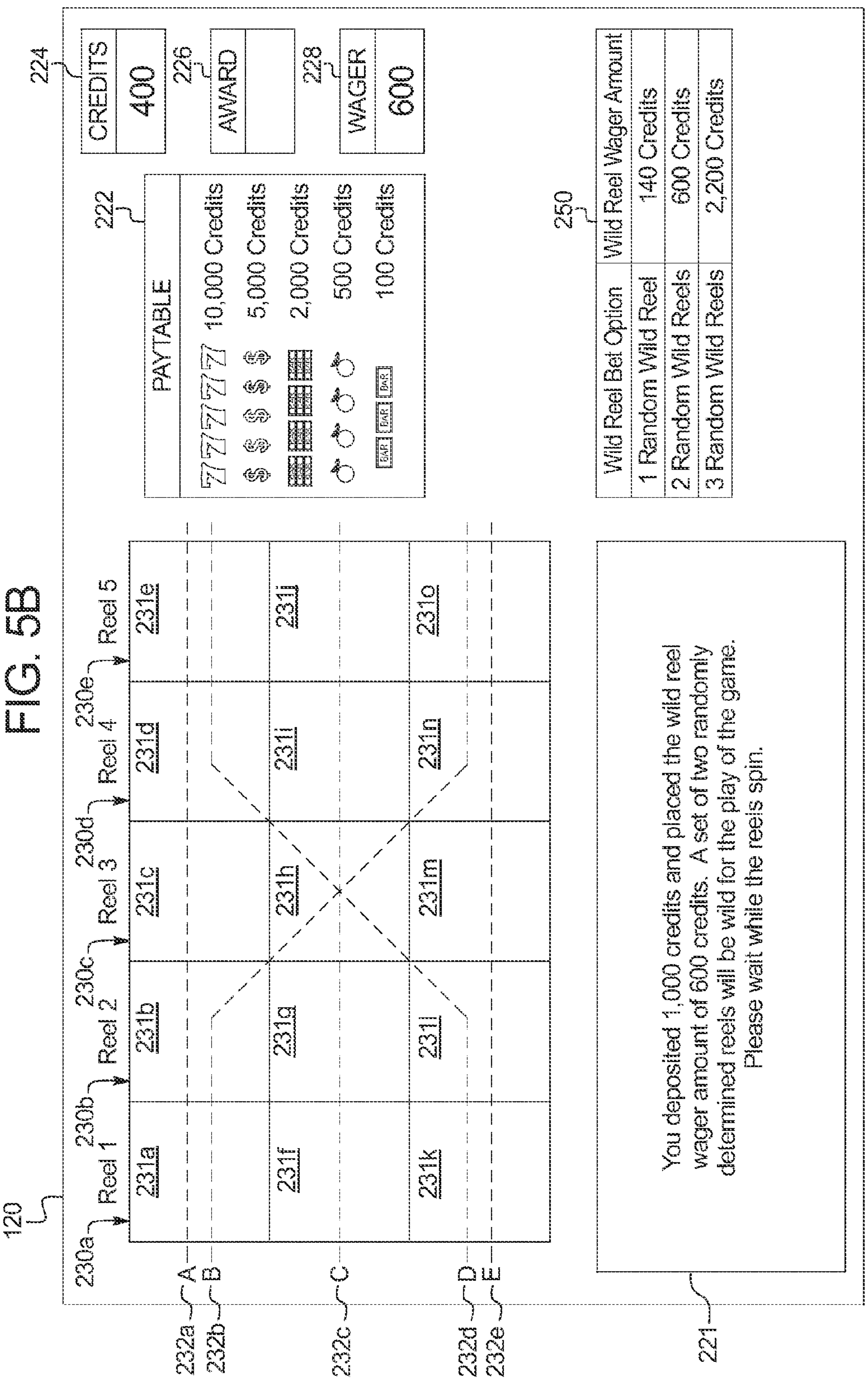
Figure 5C:
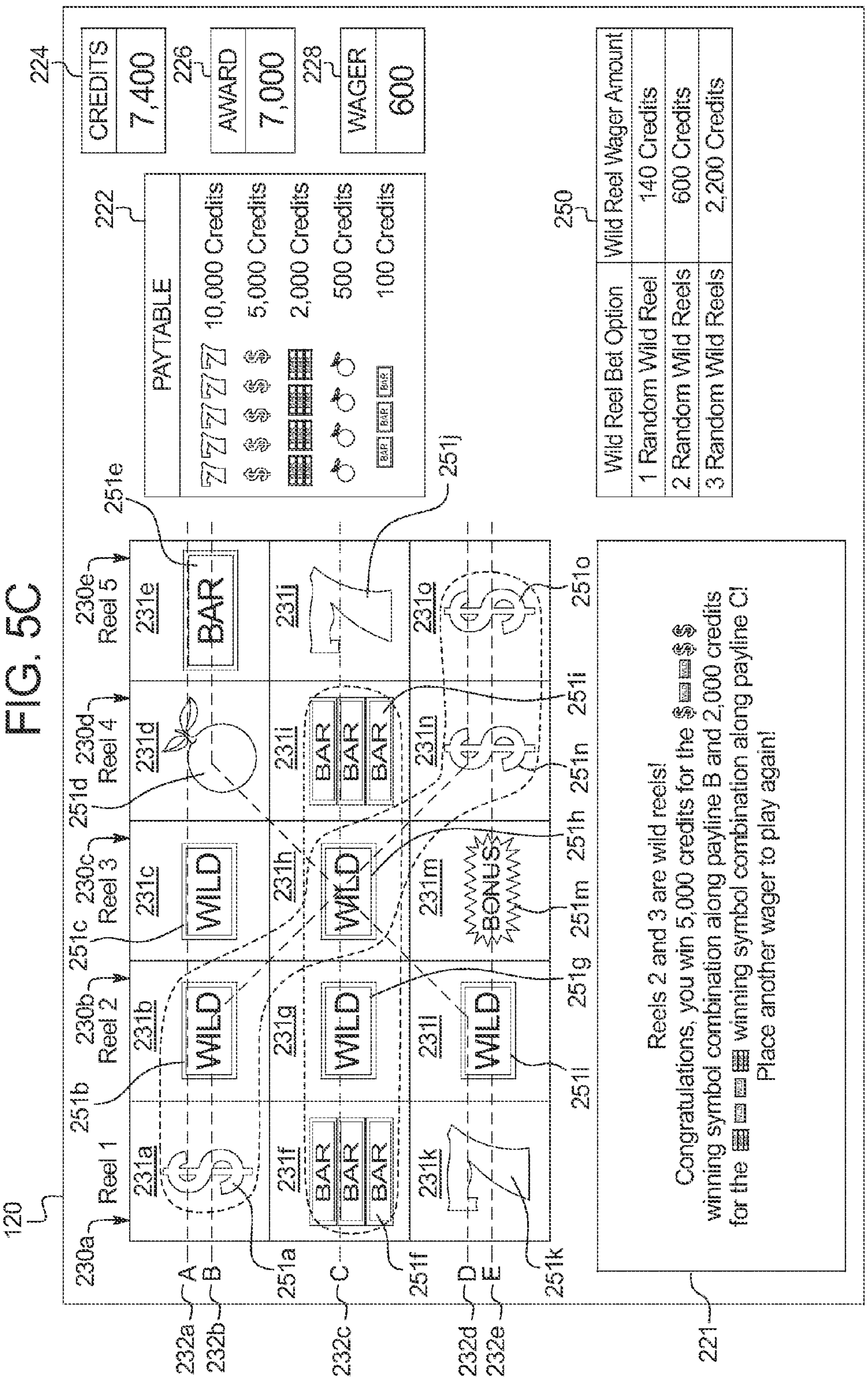

FIGS. 5A, 5B, and 5C illustrate screen shots of one embodiment of the gaming system, gaming device, and method of the present disclosure configured to operate the above-described embodiment of the primary game. More specifically, in this example, the primary game is a spinning reel type game including: (a) a plurality of reels including a plurality of symbols; and (b) a plurality of different wild reel wager options, each of which is associated with a different one of a plurality of different wild reel wager amounts and a different one of a plurality of different designated quantities of the reels. In this example, the plurality of symbols includes a bonus symbol. When three of the bonus symbol are generated and displayed along a wagered-on payline following a spin of the reels, the gaming system initiates a bonus game.

In this example, the gaming system includes a display device 220 that displays a plurality of reels 230*a*, 230*b*, 230*c*, 230*d*, and 230*e*. Each of reels 230*a*, 230*b*, 230*c*, 230*d*, and 230*e* includes a plurality of the symbols. Display device 220 also displays a plurality of symbol display areas 231*a*, 231*b*, 231*c*, 231*d*, 231*e*, 231*f*, 231*g*, 231*h*, 231*i*, 231*j*, 231*k*, 231*l*, 231*m*, 231*n*, and 231*o*. Reel 230*a* displays symbols at symbol display areas 231*a*, 231*f*, and 231*k*; reel 230*b* displays symbols at symbol display areas 231*b*, 231*g*, and 231*l*; reel 230*c* displays symbols at symbol display areas 231*c*, 231*h*, and 231*m*; reel 230*d* displays symbols at symbol display areas 231*d*, 231*i*, and 231*n*; and reel 230*e* displays symbols at symbol display areas 231*e*, 231*j*, and 231*o*.

Display device 220 displays a plurality of paylines for the primary game, each of which is associated with a different plurality of the symbol display areas. Specifically, payline A 132*a* is associated with symbol display areas 231*a*, 231*b*, 231*c*, 231*d*, and 231*e*; payline B 132*b* is associated with symbol display areas 231*a*, 231*b*, 231*h*, 231*n*, and 231*o*; payline C 132*c* is associated with symbol display areas 231*f*, 231*g*, 231*h*, 231*i*, and 231*j*; payline D 132*d* is associated with symbol display areas 231*k*, 2311, 231*h*, 231*d*, and 231*e*; and payline E 132*e* is associated with symbol display areas 231*k*, 2311, 231*m*, 231*n*, and 231*o*. Payline A 132*a*, payline B 132*b*, payline C 132*c*, payline D 132*d*, and payline E 132*e* are sometimes referred to herein as paylines A, B, C, D, and E.

Display device 220 displays a paytable 222 for the primary game that includes a plurality of winning symbol combinations. Paytable 222 indicates the credit payout associated with each respective winning symbol combination. In this illustrated example, paytable 222 indicates the credit payout associated with each respective winning symbol combination when the maximum wager, which is 30 credits in this example (but could be any suitable amount), is placed by a player for a play of the primary game. More specifically, winning symbol combination SEVEN-SEVEN-SEVEN-SEVEN-SEVEN is associated with an award of 10,000 credits; winning symbol combination DOLLAR SIGN-DOLLAR SIGN-DOLLAR SIGN-DOLLAR SIGN-DOLLAR SIGN is associated with an award of 5,000 credits; winning symbol combination TRIPLE BAR-TRIPLE BAR-TRIPLE BAR-TRIPLE BAR is associated with an award of 2,000 credits; winning symbol combination ORANGE-ORANGE-ORANGE-ORANGE is associated with an award of 500 credits; and winning symbol combination BAR-BAR-BAR is associated with an award of 100 credits.

Display device 220 also displays a wild reel bet option indicator 250, which indicates each of the wild reel bet options and their associated wild reel wager amounts. That is, in this example, wild reel bet option indicator 250 indicates the designated quantity of the reels and the wild reel wager amount associated with each available wild reel bet option. It should be appreciated that, in this example, wild reel bet option indicator 250 indicates the wild reel wager amounts associated with each respective wild reel bet option when all of paylines A, B, C, D, and E are being wagered on. That is, the wild reel wager amounts may differ if the player desires to wager one of the wild reel wager amounts on fewer than all of the paylines. Wild reel bet option indicator 250 indicates the following wild reel bet options: (a) a 1 Random Wild Reel wild reel bet option associated with a designated quantity of one of the reels and a wild reel wager amount of 140 credits; (b) a 2 Random Wild Reels wild reel bet option associated with a designated quantity of two of the reels and a wild reel wager amount of 600 credits; and (c) a 3 Random Wild Reels wild reel bet option associated with a designated quantity of three of the reels and a wild reel wager amount of 2,200 credits. It should be appreciated that the gaming system enables a player to wager one of the wild reel wager options in any suitable manner, such as those described above.

It should be appreciated that, in various embodiments: (a) the primary game may include, and the display device may display, any suitable quantity of reels including any suitable quantity of corresponding symbol display areas in any suitable configuration or arrangement; (b) the primary game may include, and the display device may display, any suitable quantity of paylines for the primary game; (c) each of the displayed paylines may be associated with any suitable quantity of the symbol display areas and any suitable combination of the symbol display areas; (d) any other suitable award determination other than a payline evaluation may be used, such as a ways to win and/or a scatter pay award determination (described in detail above); (e) the paytable may be modified to reflect lower credit payouts when a wager that is less than the maximum wager is placed by the player for the wagering game; (f) any suitable paytable including any suitable quantity of winning symbol combinations may be employed; (g) any suitable combination of the symbols may be used as a winning symbol combination; (h) the winning symbol combinations may be associated with any suitable credit payouts; (i) any suitable quantity of paytables may be utilized; (j) any suitable symbols may be employed and may include, for example, any suitable markings or indicia such as letters, numbers, or illustrations or pictures of objects; (k) the display device does not display the wild reel bet option indicator; (l) the wild reel bet option indicator is displayed elsewhere on the gaming system; (m) the primary game may include, and the display device may display, any suitable quantity of wild reel bet options; and (n) the wild reel wager amounts may be lowered if the player desires to wager one of the wild reel wager amounts on fewer than all of the paylines.

Display device 220 displays an indication, notification, or message display area 221, which displays information, notifications, and/or messages before, during, or after play; a credit meter 224, which indicates the player's credit balance; a wager indicator or display 228, which indicates any wager placed by the player for a play of the primary game; and an award indicator or display 226, which indicates any award a player has won during a play of the primary game.

As illustrated in FIG. 5A, when the gaming system is not being played, message display area 221 displays a message that invites a player to place a wager on one or more paylines for a play of the primary game. The message notifies the player that if three of the bonus symbol are generated and displayed along a wagered-on payline, the player will get to play a bonus game.

As illustrated in FIG. 5B, the player deposits currency and is provided with 1,000 credits. The player wagers the wild reel wager amount of 600 credits associated with the 2 Random Wild Reels wild reel wager option included in wild reel wager option indicator 250 on a play of the primary game. Thus, as indicated by the message displayed in message display area 221, the gaming system will cause two of reels 230*a*, 230*b*, 230*c*, 230*d*, and 230*e* to be wild reels for this play of the primary game. The player's total remaining credit balance of 400 credits (i.e., the player's initial credit balance of 1,000 credits minus the player's wager of 600 credits) is indicated in credit meter 224. The player's wager of 600 credits is indicated in wager indicator 228. In this embodiment, the gaming system: (a) randomly determines which reels to cause to be wild reels, and (b) causes the determined reel or reels to be a wild reel or reels by replacing all of the symbols on the reel or reels, except for any bonus symbols, with wild symbols. It should be appreciated that, in this example, all paylines (i.e., paylines A, B, C, D, and E) are active when the player places one of the wild reel wager amounts.

As illustrated in FIG. 5C, the gaming system randomly determined reel 230*b* and reel 230*c* (i.e., Reels 2 and 3 in this example) to be wild reels. For the play of the game: (a) reel 230*a* spins and displays symbols 251*a*, 251*f*, and 251*k* at symbol display areas 231*a*, 231*f*, and 231*k*, respectively; (b) reel 230*b* spins and displays symbols 251*b*, 251*g*, and 251*l* at symbol display areas 231*b*, 231*g*, and 231*l*, respectively; (c) reel 230*c* spins and displays symbols 251*c*, 251*h*, and 251*m* at symbol display areas 231*c*, 231*h*, and 231*m*, respectively; (d) reel 230*d* spins and displays symbols 251*d*, 251*i*, and 251*n* at symbol display areas 231*d*, 231*i*, 231*n*, respectively; and (e) reel 230*e* spins and displays symbols 251*e*, 251*j*, and 2510 at symbol display areas 231*e*, 231*j*, and 231*o*, respectively. As indicated by the message displayed in message display area 221, the player wins 5,000 credits for the DOLLAR SIGN-WILD-WILD-DOLLAR SIGN-DOLLAR SIGN winning symbol combination (which is considered to be a DOLLAR SIGN-DOLLAR SIGN-DOLLAR SIGN-DOLLAR SIGN-DOLLAR SIGN winning symbol combination by virtue of the wild symbols) displayed along payline B; and 2,000 credits for the TRIPLE BAR-WILD-WILD-TRIPLE BAR winning symbol combination (which is considered to be an TRIPLE BAR-TRIPLE BAR-TRIPLE BAR-TRIPLE BAR winning symbol combination by virtue of the wild symbols) along payline C. Accordingly, the 7,000 credit award is indicated in award indicator 226. The player's new credit balance of 7,400 credits (which reflects the player's previous credit balance of 400 credits plus the 7,000 credit award) is indicated by credit meter 224.

Figure 3C:
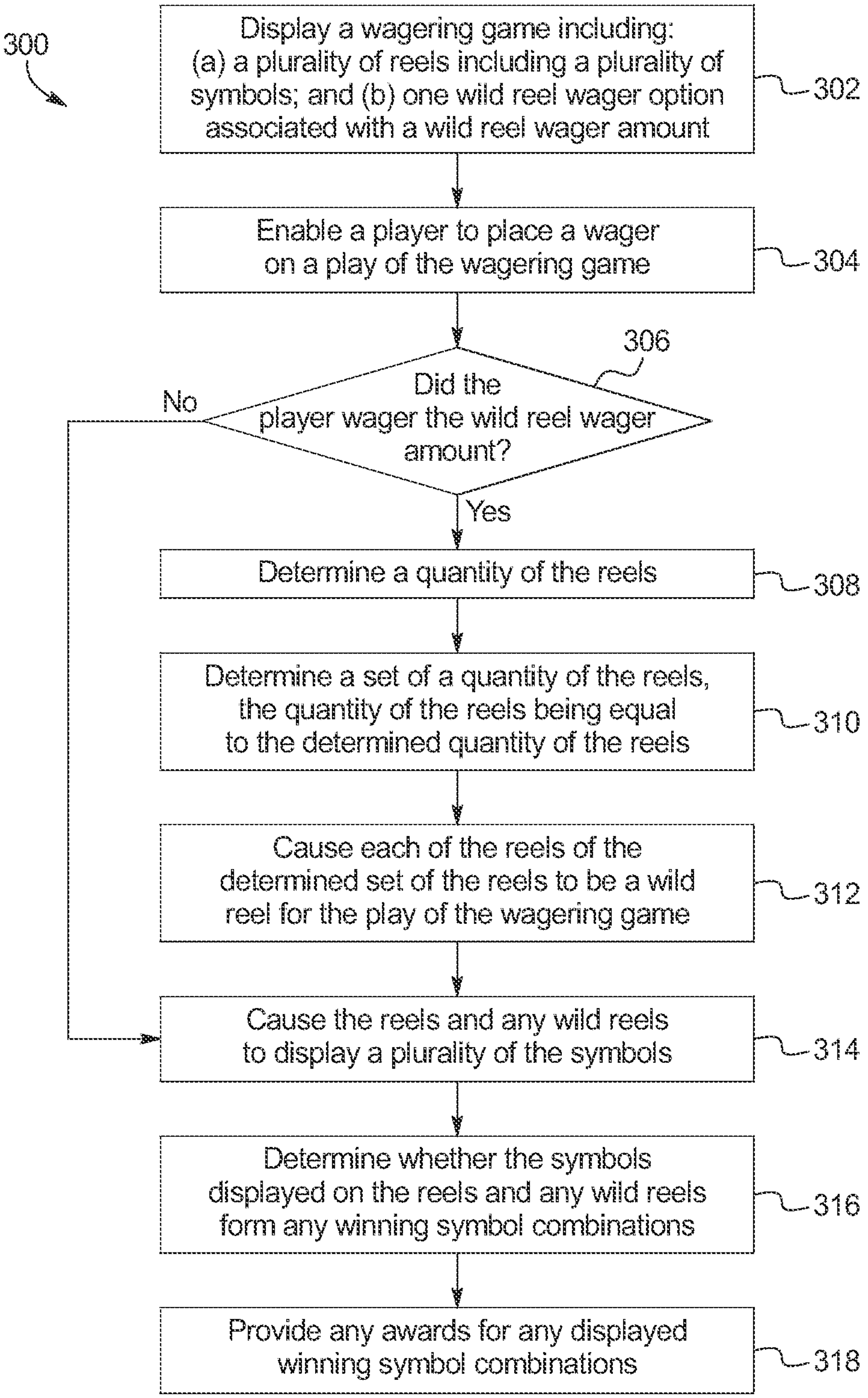
FIG. 3C is a flowchart illustrating an example method of operating a gaming system of another embodiment of the present disclosure in which the primary game includes: (a) a plurality of reels; and (b) a wild reel wager option associated with a wild reel wager amount.

FIG. 3C illustrates a flowchart of an example of a process or method 300 for operating a gaming system of the present disclosure that is configured to operate another embodiment of the spinning reel type primary game including: (a) a plurality of reels; and (b) one wild reel wager option associated with a wild reel wager amount.

In one embodiment, this process 300 is represented by a set of instructions stored in one or more memories and executed by one or more processors or controllers. Although this process 300 is described with reference to the flowchart shown in FIG. 3C, it should be appreciated that many other processes of performing the acts associated with this illustrated process may be employed. For example, the order of certain of the illustrated blocks and/or diamonds may be changed, certain of the illustrated blocks and/or diamonds may be optional, and/or certain of the illustrated blocks and/or diamonds may not be employed.

In operation of one embodiment, the gaming system displays a wagering game including: (a) a plurality of reels including a plurality of symbols; and (b) a wild reel wager option, as indicated by block 302. The wild reel wager option is associated with a wild reel wager amount. The gaming system enables a player to place a wager on a play of the wagering game, as indicated by block 304. The gaming system determines whether the player wagered the wild reel wager amount, as indicated by diamond 306. If the player did not wager the wild reel wager amount, process 300 proceeds to block 314, as further described below.

If the player wagered the wild reel wager amount, the gaming system determines a quantity of the reels, as indicated by block 308. The gaming system determines a set of a quantity of the reels, as indicated by block 310. The quantity of the reels included in the determined set of the reels is equal to the determined quantity of the reels. The gaming system causes each of the reels of the determined set of the reels to be a wild reel for the play of the wagering game, as indicated by block 312. The gaming system causes the reels and any wild reels to display a plurality of the symbols, as indicated by block 314. The gaming system determines whether the symbols displayed on the reels and any wild reels form any winning symbol combinations, as indicated by block 316. The gaming system provides any awards for any displayed winning symbol combinations, as indicated by block 318.

Figure 6A:
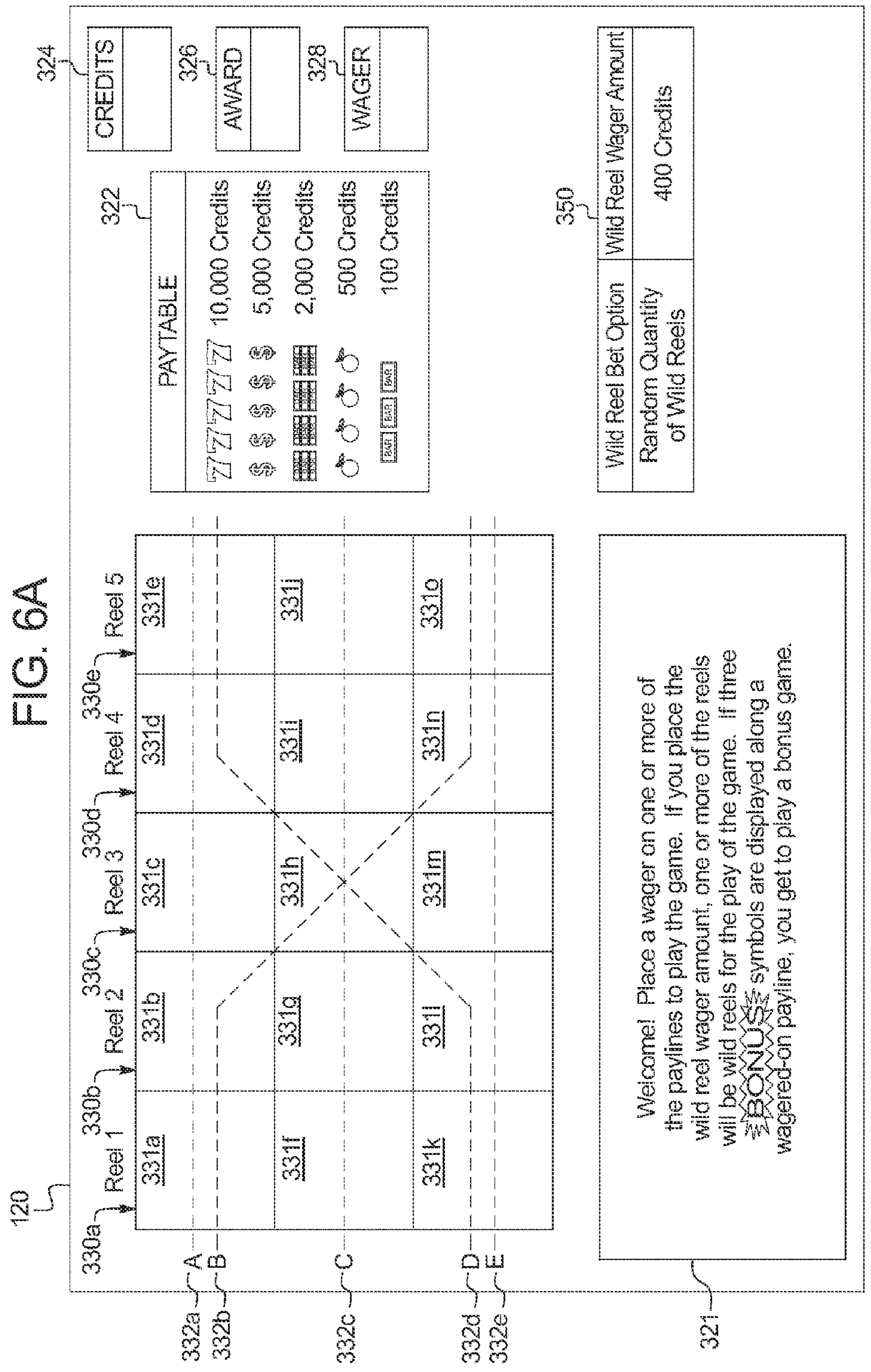
FIGS. 6A, 6B, and 6C are front views of a display device of the gaming system of another embodiment of the present disclosure, and illustrate an example play of an embodiment of the primary game including: (a) a plurality of reels; and (b) a wild reel wager option associated with a wild reel wager amount.
Figure 6B:
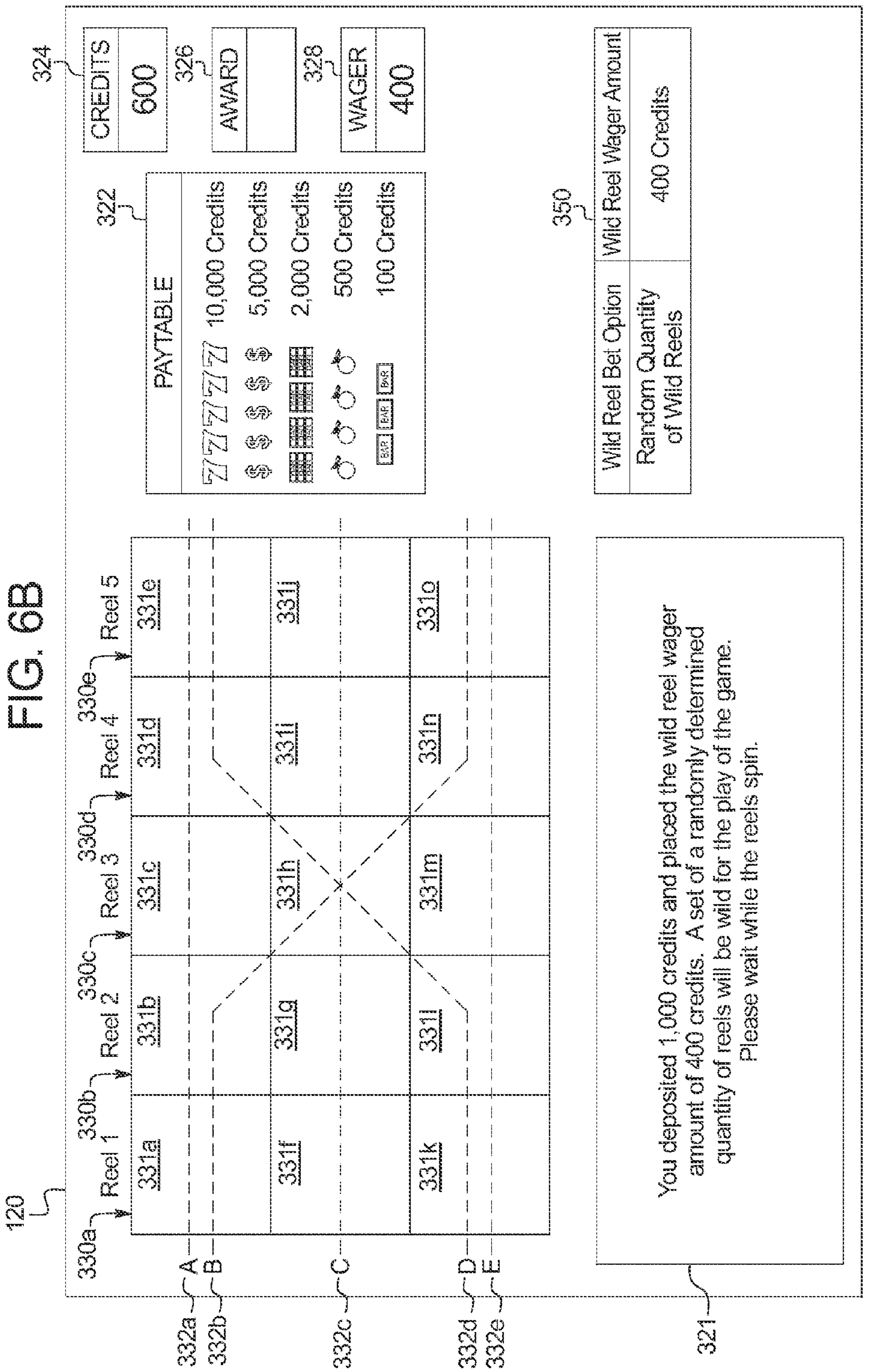
Figure 6C:
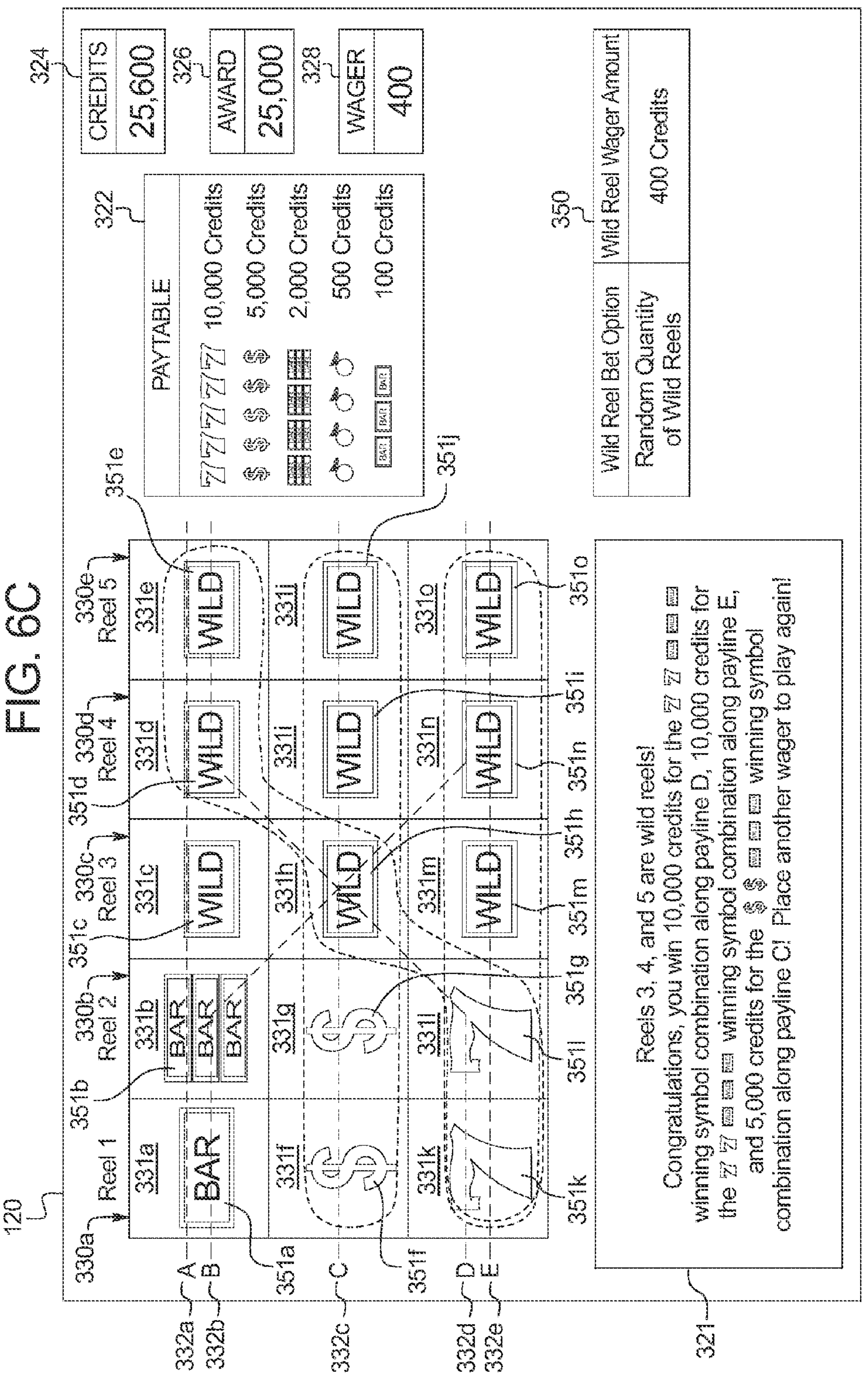

FIGS. 6A, 6B, and 6C are front views of a display device of the gaming system of the present disclosure, and illustrate an example play of the above-described embodiment of the primary game including: (a) a plurality of reels; and (b) a wild reel wager option associated with a wild reel wager amount.

FIGS. 6A, 6B, and 6C illustrate screen shots of one embodiment of the gaming system, gaming device, and method of the present disclosure configured to operate the above-described embodiment of the primary game. More specifically, in this example, the primary game is a spinning reel type game including: (a) a plurality of reels including a plurality of symbols; and (b) a wild reel wager option associated with a wild reel wager amount. In this example, the plurality of symbols includes a bonus symbol. When three of the bonus symbol are generated and displayed along a wagered-on payline following a spin of the reels, the gaming system initiates a bonus game.

In this example, the gaming system includes a display device 320 that displays a plurality of reels 330*a*, 330*b*, 330*c*, 330*d*, and 330*e*. Each of reels 330*a*, 330*b*, 330*c*, 330*d*, and 330*e* includes a plurality of the symbols. Display device 320 also displays a plurality of symbol display areas 331*a*, 331*b*, 331*c*, 331*d*, 331*e*, 331*f*, 331*g*, 331*h*, 331*i*, 331*j*, 331*k*, 331*l*, 331*m*, 331*n*, and 331*o*. Reel 330*a* displays symbols at symbol display areas 331*a*, 331*f*, and 331*k*; reel 330*b* displays symbols at symbol display areas 331*b*, 331*g*, and 331*l*; reel 330*c* displays symbols at symbol display areas 331*c*, 331*h*, and 331*m*; reel 330*d* displays symbols at symbol display areas 331*d*, 331*i*, and 331*n*; and reel 330*e* displays symbols at symbol display areas 331*e*, 331*j*, and 331*o*.

Display device 320 displays a plurality of paylines for the primary game, each of which is associated with a different plurality of the symbol display areas. Specifically, payline A 332*a* is associated with symbol display areas 331*a*, 331*b*, 331*c*, 331*d*, and 331*e*; payline B 332*b* is associated with symbol display areas 331*a*, 331*b*, 331*h*, 331*n*, and 331*o*; payline C 332*c* is associated with symbol display areas 331*f*, 331*g*, 331*h*, 331*i*, and 331*j*; payline D 332*d* is associated with symbol display areas 331*k*, 331*l*, 331*h*, 331*d*, and 331*e*; and payline E 332*e* is associated with symbol display areas 331*k*, 3311, 331*m*, 331*n*, and 331*o*. Payline A 332*a*, payline B 332*b*, payline C 332*c*, payline D 332*d*, and payline E 332*e* are sometimes referred to herein as paylines A, B, C, D, and E.

Display device 320 displays a paytable 322 for the primary game that includes a plurality of winning symbol combinations. Paytable 322 indicates the credit payout associated with each respective winning symbol combination. In this illustrated example, paytable 322 indicates the credit payout associated with each respective winning symbol combination when the maximum wager, which is 30 credits in this example (but could be any suitable amount), is placed by a player for a play of the primary game. More specifically, winning symbol combination SEVEN-SEVEN-SEVEN-SEVEN-SEVEN is associated with an award of 10,000 credits; winning symbol combination DOLLAR SIGN-DOLLAR SIGN-DOLLAR SIGN-DOLLAR SIGN-DOLLAR SIGN is associated with an award of 5,000 credits; winning symbol combination TRIPLE BAR-TRIPLE BAR-TRIPLE BAR-TRIPLE BAR is associated with an award of 2,000 credits; winning symbol combination ORANGE-ORANGE-ORANGE-ORANGE is associated with an award of 500 credits; and winning symbol combination BAR-BAR-BAR is associated with an award of 100 credits.

Display device 320 also displays a wild reel bet option indicator 350, which indicates a wild reel bet option and its associated wild reel wager amount. It should be appreciated that, in this example, wild reel bet option indicator 350 indicates the wild reel wager amount associated with the wild reel bet option when all of paylines A, B, C, D, and E are being wagered on. That is, the wild reel wager amount may differ if the player desires to wager the wild reel wager amount on fewer than all of the paylines. Wild reel bet option indicator 350 indicates a Random Quantity of Wild Reels wild reel bet option associated with a wild reel wager amount of 400 credits.

It should be appreciated that, in various embodiments: (a) the primary game may include, and the display device may display, any suitable quantity of reels including any suitable quantity of corresponding symbol display areas in any suitable configuration or arrangement; (b) the primary game may include, and the display device may display, any suitable quantity of paylines for the primary game; (c) each of the displayed paylines may be associated with any suitable quantity of the symbol display areas and any suitable combination of the symbol display areas; (d) any other suitable award determination other than a payline evaluation may be used, such as a ways to win and/or a scatter pay award determination (described in detail above); (e) the paytable may be modified to reflect lower credit payouts when a wager that is less than the maximum wager is placed by the player for the wagering game; (f) any suitable paytable including any suitable quantity of winning symbol combinations may be employed; (g) any suitable combination of the symbols may be used as a winning symbol combination; (h) the winning symbol combinations may be associated with any suitable credit payouts; (i) any suitable quantity of paytables may be utilized; (j) any suitable symbols may be employed and may include, for example, any suitable markings or indicia such as letters, numbers, or illustrations or pictures of objects; (k) the display device does not display the wild reel bet option indicator; (l) the wild reel bet option indicator is displayed elsewhere on the gaming system; (m) the primary game may include, and the display device may display, any suitable quantity of wild reel bet options; and (n) the wild reel wager amounts may be lowered if the player desires to wager one of the wild reel wager amounts on fewer than all of the paylines.

Display device 320 displays an indication, notification, or message display area 321, which displays information, notifications, and/or messages before, during, or after play; a credit meter 324, which indicates the player's credit balance; a wager indicator or display 328, which indicates any wager placed by the player for a play of the primary game; and an award indicator or display 326, which indicates any award a player has won during a play of the primary game.

As illustrated in FIG. 6A, when the gaming system is not being played by a player, message display area 321 displays a message that invites a player to place a wager on one or more paylines for a play of the primary game. The message notifies the player that if three of the bonus symbol are generated and displayed along a wagered-on payline, the player will get to play a bonus game.

As illustrated in FIG. 6B, the player deposits currency and is provided with 1,000 credits. The player wagers the wild reel wager amount of 400 credits associated with the Random Quantity of Wild Reels wild reel wager option included in wild reel wager option indicator 350 on a play of the primary game. Thus, as indicated by the message displayed in message display area 321, the gaming system will cause a determined quantity of reels 330*a*, 330*b*, 330*c*, 330*d*, and 330*e* to be wild reels for this play of the primary game. The player's wager of 400 credits is indicated in wager indicator 328. The player's total remaining credit balance of 600 credits (i.e., the player's initial credit balance of 1,000 credits minus the player's wager of 400 credits) is indicated in credit meter 324. In this embodiment, the gaming system: (a) randomly determines a quantity of the reels, (b) randomly determines which reels to cause to be wild reels, and (b) causes the determined reel or reels to be a wild reel or reels by replacing all of the symbols on the reel or reels, except for any bonus symbols, with wild symbols. It should be appreciated that, in this example, all paylines (i.e., paylines A, B, C, D, and E) are active when the player places one of the wild reel wager amounts.

As illustrated in FIG. 6C, the gaming system randomly determined: (a) a quantity of three reels; and (b) reel 330*c*, reel 330*d*, and reel 330*e* (i.e., Reels 3, 4, and 5 in this example) to be wild reels. For the play of the game: (a) reel 330*a* spins and displays symbols 351*a*, 351*f*, and 351*k* at symbol display areas 331*a*, 331*f*, and 331*k*, respectively; (b) reel 330*b* spins and displays symbols 351*b*, 351*g*, and 351*l* at symbol display areas 331*b*, 331*g*, and 331*l*, respectively; (c) reel 330*c* spins and displays symbols 351*c*, 351*h*, and 351*m* at symbol display areas 331*c*, 331*h*, and 331*m*, respectively; (d) reel 330*d* spins and displays symbols 351*d*, 351*i*, and 351*n* at symbol display areas 331*d*, 331*i*, 331*n*, respectively; and (e) reel 330*e* spins and displays symbols 351*e*, 351*j*, and 351*o* at symbol display areas 331*e*, 331*j*, and 331*o*, respectively. As indicated by the message displayed in message display area 321, the player wins 5,000 credits for the DOLLAR SIGN-DOLLAR SIGN-WILD-WILD-WILD winning symbol combination (which is considered to be a DOLLAR SIGN-DOLLAR SIGN-DOLLAR SIGN-DOLLAR SIGN-DOLLAR SIGN winning symbol combination by virtue of the wild symbols) displayed along payline C; 10,000 credits for the 7-7-WILD-WILD-WILD winning symbol combination (which is considered to be an 7-7-7-7-7 winning symbol combination by virtue of the wild symbols) along payline D; and 10,000 credits for the 7-7-WILD-WILD-WILD winning symbol combination (which is considered to be an 7-7-7-7-7 winning symbol combination by virtue of the wild symbols) along payline E. Accordingly, the 25,000 credit award is indicated in award indicator 326. The player's new credit balance of 25,600 credits (which reflects the player's previous credit balance of 600 credits plus the 25,000 credit award) is indicated by credit meter 324.

While the above-described examples describe the gaming system, gaming device, and method providing one or more wild reel wager options with respect to a primary game including a plurality of reels, it should be appreciated that the present disclosure contemplates providing one or more wild reel wager options with respect to any suitable reel type game. For example, in certain embodiments, the primary game includes a plurality of independent reels, each of which includes a plurality of symbols and is configured to display one of those symbols at a symbol display area following a spin of that reel. In these embodiments, the primary game includes wild reel wager options each associated with a wild reel wager amount and one of: (a) certain of the independent reels; (b) a designated quantity of the independent reels; and (c) a determined quantity of the independent reels. In these embodiments, the gaming system causes certain of the independent reels to become wild independent reels for a play of the primary game on which a player wagers one of the wild reel wager amounts.

In certain other embodiments the primary game includes a plurality of symbol display areas, each of which is configured to display a randomly generated symbol. In these embodiments, the primary game includes wild reel wager options each associated with a wild reel wager amount and one of: (a) certain of the symbol display areas; (b) a designated quantity of the symbol display areas; and (c) a determined quantity of the symbol display areas. In these embodiments, the gaming system causes certain of the symbol display areas to become wild symbol display areas for a play of the primary game on which a player wagers one of the wild reel wager amounts.

Although the above-described examples describe the gaming system, gaming device, and method providing one or more wild reel wager options with respect to a primary game, it should be appreciated that the present disclosure contemplates providing one or more wild reel wager options in a secondary or bonus game.

It should be understood that various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:

at least one display device;

at least one input device;

at least one processor; and at least one memory device storing a plurality of instructions which, when executed by the at least one processor, cause the at least one processor to operate with the at least one display device and the at least one input device to:

(a) display a primary wagering game including:

(i) a plurality of reels including a plurality of symbols; and (ii) a plurality of different wild reel wager amounts, each of the wild reel wager amounts being associated with a different one of a plurality of different predetermined sets of the reels, each of the predetermined sets of the reels including one of a plurality of designated quantities of one or more reels; and (b) if the player places one of the wild reel wager amounts for a play of the primary wagering game:

(i) cause each of the reels of the predetermined set of the reels associated with said wagered wild reel wager amount to be a wild reel for said play of the primary wagering game;

(ii) cause the reels and the wild reels to display a plurality of the symbols;

(iii) determine whether the symbols displayed on the reels and the wild reels form any winning symbol combinations; and (iv) provide any awards for any displayed winning symbol combinations.

2. The gaming system of claim 1, wherein a plurality of the predetermined sets of the reels each include a designated quantity of two or more reels.

3. The gaming system of claim 1, wherein each of the predetermined sets of the reels includes a designated quantity of two or more reels.

4. The gaming system of claim 1, wherein a first one of the wild reel wager amounts associated with a first one of the predetermined sets of the reels is associated with a first average expected payback percentage and a second, greater one of the wild reel wager amounts associated with a second one of the predetermined sets of the reels is associated with a second, greater average expected payback percentage.

5. The gaming system of claim 1, wherein the plurality of instructions, when executed by the at least one processor, cause the at least one processor to cause each of the reels of the predetermined set of the reels associated with said wagered wild reel wager amount to be a wild reel for said play of the primary wagering game by replacing one or more of the symbols on said reels with a wild symbol.

6. The gaming system of claim 1, which includes a bonus game, and wherein the plurality of instructions, when executed by the at least one processor, cause the at least one processor, if the player places one of the wild reel wager amounts for a play of the primary wagering game, if a play of the bonus game is initiated, to cause each of the reels of the predetermined set of the reels associated with said wagered wild reel wager amount to be a wild reel for said play of the bonus game.

7. A gaming system comprising:

at least one display device;

at least one input device;

at least one processor; and at least one memory device storing a plurality of instructions which, when executed by the at least one processor, cause the at least one processor to operate with the at least one display device and the at least one input device to:

(a) display a primary wagering game including:

(i) a plurality of reels including a plurality of symbols; and (ii) a plurality of different wild reel wager amounts, each of the wild reel wager amounts being associated with one of a plurality of different predetermined designated quantities of the reels, at least one of the predetermined designated quantities of the reels being greater than one; and (b) if the player places one of the wild reel wager amounts for a play of the primary wagering game:

(i) cause each of the reels of a first set of the reels to be a wild reel for said play of the primary wagering game, the first set of the reels including a quantity of the reels equal to the predetermined designated quantity of the reels associated with said wagered wild reel wager amount;

(ii) cause the reels and the wild reels to display a plurality of the symbols;

(iii) determine whether the symbols displayed on the reels and the wild reels form any winning symbol combinations; and (iv) provide any awards for any displayed winning symbol combinations.

8. The gaming system of claim 7, wherein a plurality of the predetermined designated quantities of the reels are each greater than one.

9. The gaming system of claim 7, wherein each of the predetermined designated quantities of the reels is greater than one.

10. The gaming system of claim 7, wherein a first one of the wild reel wager amounts associated with a first one of the predetermined designated quantities of the reels is associated with a first average expected payback percentage and a second, greater one of the wild reel wager amounts associated with a second one of the predetermined designated quantities of the reels is associated with a second, greater average expected payback percentage.

11. The gaming system of claim 7, wherein the plurality of instructions, when executed by the at least one processor, cause the at least one processor to cause each of the reels of the first set of the reels to be a wild reel for said play of the primary wagering game by replacing one or more of the symbols on said reels with a wild symbol.

12. The gaming system of claim 7, wherein the plurality of instructions, when executed by the at least one processor, cause the at least one processor to randomly determine which of the plurality of reels to include in the first set of the reels.

13. The gaming system of claim 7, wherein the plurality of instructions, when executed by the at least one processor, cause the at least one processor to determine which of the plurality of reels to include in the first set of the reels based on a weighted probability table.

14. The gaming system of claim 7, which includes a bonus game, and wherein the plurality of instructions, when executed by the at least one processor, cause the at least one processor, if the player places one of the wild reel wager amounts for a play of the primary wagering game, if a play of the bonus game is initiated, to cause each of the reels of the first set of the reels to be a wild reel for said play of the bonus game.

15. A gaming system comprising:

at least one display device;

at least one input device;

at least one processor; and at least one memory device storing a plurality of instructions which, when executed by the at least one processor, cause the at least one processor to operate with the at least one display device and the at least one input device to:

(a) receive a wager from a player for a play of a primary wagering game, said primary wagering game including a plurality of reels including a plurality of symbols; and (b) if an amount of the received wager is a wild reel wager amount, for said wagered-on play of the primary wagering game:

(i) determine one of a plurality of quantities of one or more of the reels;

(ii) cause each of the reels of a first set of the reels to be a guaranteed wild reel for said play of the primary wagering game, the first set of the reels including a quantity of the reels equal to the determined one of the quantities of the reels;

(iii) cause the reels and the wild reels to display a plurality of the symbols;

(iv) determine whether the symbols displayed on the reels and the wild reels form any winning symbol combinations; and (v) provide any awards for any displayed winning symbol combinations.

16. The gaming system of claim 15, wherein a plurality of the quantities of the reels are each greater than one.

17. The gaming system of claim 15, wherein each of the quantities of the reels is greater than one.

18. The gaming system of claim 15, wherein the plurality of instructions, when executed by the at least one processor, cause the at least one processor to cause each of the reels of the first set of the reels to be a wild reel for said play of the primary wagering game by replacing one or more of the symbols on said reels with a wild symbol.

19. The gaming system of claim 15, wherein the plurality of instructions, when executed by the at least one processor, cause the at least one processor to randomly determine one of the quantities of the reels.

20. The gaming system of claim 15, wherein the plurality of instructions, when executed by the at least one processor, cause the at least one processor to randomly determine which of the plurality of reels to include in the first set of the reels.

21. The gaming system of claim 15, which includes a bonus game, and wherein the plurality of instructions, when executed by the at least one processor, cause the at least one processor, if the player places the wild reel wager amount for a play of the primary wagering game, if a play of the bonus game is initiated, to cause each of the reels of the first set of the reels to be a wild reel for said play of the bonus game.

22. The gaming system of claim 15, wherein the plurality of instructions, when executed by the at least one processor, cause the at least one processor to simultaneously determine, based on a weighted paytable: (a) one of the quantities of one or more of the reels, and (b) which of the plurality of the reels to include in the first set of the reels.

23. A gaming system comprising:

at least one display device;

at least one input device;

at least one processor; and at least one memory device storing a plurality of instructions which, when executed by the at least one processor, cause the at least one processor to operate with the at least one display device and the at least one input device to:

(a) display a wagering game including:

(i) a plurality of reels including a plurality of symbols; and (ii) a plurality of different wild reel wager amounts, each of the wild reel wager amounts being associated with a different one of a plurality of different predetermined sets of the reels, each of the predetermined sets of the reels including at least one of the reels, at least one of the predetermined sets of the reels including two or more of the reels; and (b) if the player places one of the wild reel wager amounts for a play of the wagering game:

(i) cause each of the reels of the predetermined set of the reels associated with said wagered wild reel wager amount to be a wild reel for said play of the wagering game without replacing any bonus symbols on said reels;

(ii) cause the reels and the wild reels to display a plurality of the symbols;

(iii) determine whether the symbols displayed on the reels and the wild reels form any winning symbol combinations; and (iv) provide any awards for any displayed winning symbol combinations.

24. A gaming system comprising:

at least one display device;

at least one input device;

at least one processor; and at least one memory device storing a plurality of instructions which, when executed by the at least one processor, cause the at least one processor to operate with the at least one display device and the at least one input device to:

(a) display a wagering game including:

(i) a plurality of reels including a plurality of symbols; and (ii) a plurality of different wild reel wager amounts, each of the wild reel wager amounts being associated with a different one of a plurality of different predetermined sets of the reels, each of the predetermined sets of the reels including at least one of the reels, at least one of the predetermined sets of the reels including two or more of the reels;

(b) if the player places one of the wild reel wager amounts for a play of the wagering game:

(i) cause each of the reels of the predetermined set of the reels associated with said wagered wild reel wager amount to be a wild reel for said play of the wagering game;

(ii) cause the reels and the wild reels to display a plurality of the symbols;

(iii) determine whether the symbols displayed on the reels and the wild reels form any winning symbol combinations; and (iv) provide any awards for any displayed winning symbol combinations; and (c) if a bonus triggering event occurs, initiate a bonus game, wherein a frequency of occurrence of the bonus triggering event when the player wagers a wager amount that is not one of the wild reel wager amounts is the same as a frequency of occurrence of the bonus triggering event when the player wagers one of the wild reel wager amounts.

25. A gaming system comprising:

at least one display device;

at least one input device;

at least one processor; and at least one memory device storing a plurality of instructions which, when executed by the at least one processor, cause the at least one processor to operate with the at least one display device and the at least one input device to:

(a) display a wagering game including:

(i) a plurality of reels including a plurality of symbols; and (ii) a plurality of different wild reel wager amounts, each of the wild reel wager amounts being associated with one of a plurality of different designated quantities of the reels, at least one of the designated quantities of the reels being greater than one; and (b) if the player places one of the wild reel wager amounts for a play of the wagering game:

(i) cause each of the reels of a first set of the reels to be a wild reel for said play of the wagering game without replacing any bonus symbols on said reels, the first set of the reels including a quantity of the reels equal to the designated quantity of the reels associated with said wagered wild reel wager amount;

(ii) cause the reels and the wild reels to display a plurality of the symbols;

(iii) determine whether the symbols displayed on the reels and the wild reels form any winning symbol combinations; and (iv) provide any awards for any displayed winning symbol combinations.

26. A gaming system comprising:

at least one display device;

at least one input device;

at least one processor; and at least one memory device storing a plurality of instructions which, when executed by the at least one processor, cause the at least one processor to operate with the at least one display device and the at least one input device to:

(a) display a wagering game including:

(i) a plurality of reels including a plurality of symbols; and (ii) a plurality of different wild reel wager amounts, each of the wild reel wager amounts being associated with one of a plurality of different designated quantities of the reels, at least one of the designated quantities of the reels being greater than one;

(b) if the player places one of the wild reel wager amounts for a play of the wagering game:

(i) cause each of the reels of a first set of the reels to be a wild reel for said play of the wagering game, the first set of the reels including a quantity of the reels equal to the designated quantity of the reels associated with said wagered wild reel wager amount;

(ii) cause the reels and the wild reels to display a plurality of the symbols;

(iii) determine whether the symbols displayed on the reels and the wild reels form any winning symbol combinations; and (iv) provide any awards for any displayed winning symbol combinations; and (c) if a bonus triggering event occurs, initiate a bonus game, wherein a frequency of occurrence of the bonus triggering event when the player wagers a wager amount that is not one of the wild reel wager amounts is the same as a frequency of occurrence of the bonus triggering event when the player wagers one of the wild reel wager amounts.

27. A gaming system comprising:

at least one display device;

at least one input device;

at least one processor; and at least one memory device storing a plurality of instructions which, when executed by the at least one processor, cause the at least one processor to operate with the at least one display device and the at least one input device to:

(a) display a wagering game including:

(i) a plurality of reels including a plurality of symbols; and (ii) a wild reel wager amount; and (b) if the player places the wild reel wager amount for a play of the wagering game:

(i) determine one of a plurality of quantities of one or more of the reels;

(ii) cause each of the reels of a first set of the reels to be a wild reel for said play of the wagering game without replacing any bonus symbols on said reels, the first set of the reels including a quantity of the reels equal to the determined one of the quantities of the reels;

(iii) cause the reels and the wild reels to display a plurality of the symbols;

(iv) determine whether the symbols displayed on the reels and the wild reels form any winning symbol combinations; and (v) provide any awards for any displayed winning symbol combinations.

28. A gaming system comprising:

at least one display device;

at least one input device;

at least one processor; and at least one memory device storing a plurality of instructions which, when executed by the at least one processor, cause the at least one processor to operate with the at least one display device and the at least one input device to:

(a) display a wagering game including:

(i) a plurality of reels including a plurality of symbols; and (ii) a wild reel wager amount;

(b) if the player places the wild reel wager amount for a play of the wagering game:

(i) determine one of a plurality of quantities of one or more of the reels;

(ii) cause each of the reels of a first set of the reels to be a wild reel for said play of the wagering game, the first set of the reels including a quantity of the reels equal to the determined one of the quantities of the reels;

(iii) cause the reels and the wild reels to display a plurality of the symbols;

(iv) determine whether the symbols displayed on the reels and the wild reels form any winning symbol combinations; and (v) provide any awards for any displayed winning symbol combinations; and (c) if a bonus triggering event occurs, initiate a bonus game, wherein a frequency of occurrence of the bonus triggering event when the player wagers a wager amount that is not the wild reel wager amount is the same as a frequency of occurrence of the bonus triggering event when the player wagers the wild reel wager amount.

* * * * *